US012225886B2

(12) United States Patent
Pawlick

(10) Patent No.: US 12,225,886 B2
(45) Date of Patent: Feb. 18, 2025

(54) EQUINE HEALTH AND SAFETY SYSTEM AND METHOD

(71) Applicant: EQUINE SAFETY INC., Reno, NV (US)

(72) Inventor: Harvey Pawlick, Reno, NV (US)

(73) Assignee: EQUINE SAFETY INC., Reno, NV (US)

( * ) Notice: Subject to any disclaimer, the term of this patent is extended or adjusted under 35 U.S.C. 154(b) by 0 days.

(21) Appl. No.: 18/201,606

(22) Filed: May 24, 2023

(65) Prior Publication Data

US 2023/0389523 A1 Dec. 7, 2023

Related U.S. Application Data

(60) Provisional application No. 63/473,540, filed on Jun. 3, 2022.

(51) Int. Cl.
*A01K 29/00* (2006.01)
*A01K 27/00* (2006.01)
(Continued)

(52) U.S. Cl.
CPC .......... *A01K 29/005* (2013.01); *A01K 27/002* (2013.01); *A61D 99/00* (2013.01);
(Continued)

(58) Field of Classification Search
CPC .. A01K 29/005; A01K 27/002; A01K 11/006; A01K 11/008; A01K 27/001;
(Continued)

(56) References Cited

U.S. PATENT DOCUMENTS 4,852,336 A * 8/1989 Gammill ................... B68B 1/02
54/24
5,848,576 A * 12/1998 Colaianni ............ A47D 13/086
119/770
(Continued)

OTHER PUBLICATIONS www.ebay.com/itm/https://chn=ps&var=601930839867&norover=1&mkevt=1&mkrid=711-117182-37290-0&mkcid=2&mkscid=101&itemid=601930839867_302982505599&targetid=1262749492542&device=c&mktype=&googleloc=9004032&poi=&campaignid=14859008593&mkgroupid=130497710760&rlsatarget=pla-1262749492542&abcld=9300678&merchantid=6478414&gclid=EAlalQobChMIofDytKiJ; originally accessed Apr. 19, 2023; p. 3.
(Continued)

*Primary Examiner* — Jeffrey R Larsen
(74) *Attorney, Agent, or Firm* — NIXON PEABODY LLP

(57) ABSTRACT

A health and safety system and method are described for use on equines, canines and felines, in order to obtain data on vital life-sustaining or life-threatening processes and signs directly from the animal. The vital life-sustaining and/or life-threatening processes and/or signs in the form of data are communicated from the animal to a site remote from the equine, canine and feline. The remotely communicated data can be archived and/or communicated to a veterinarian/owner/steward/ or other designate, to induce human intervention. Other sensors of the health and safety system can read/report environmental conditions, such as weather, or report other environmental conditions, such as smoke/pollution remote from, and/or proximate the animal. A position locator, such as a GPS, may also be built into the equine health and safety system. The equine health and safety system may include a halter/hackamore/bridle/harness or other components, such as a medallion, provided with a QR, or other codes, that can be read by a smart phone to put the telephone into contact with a veterinarian, an owner, stable
(Continued)

or other authorized care custodian of the equine, canine or feline. A method of providing at least one response to the read vital life processes and signs, such as warming the equine, canine or feline, is also described.

19 Claims, 15 Drawing Sheets

(51) Int. Cl.
   *A61D 99/00* (2006.01)
   *B68B 5/06* (2006.01)
(52) U.S. Cl.
   CPC .............. *B68B 5/06* (2013.01); *A01K 27/006* (2013.01); *A01K 27/009* (2013.01)
(58) Field of Classification Search
   CPC .... A01K 11/007; A01K 11/001; A01K 27/00; A01K 1/06; A01K 11/004; A01K 15/023; A01K 11/00; A01K 15/04; A61D 99/00; A61D 17/002; A61D 17/00; B68B 1/02; B68B 5/06; B68B 1/04; B68B 5/00; A61B 2503/40; A61B 5/6831; A61B 5/0002; A61B 2562/0209; A61B 5/296
   USPC .............. 119/859, 792, 421, 908; 340/573.3, 340/573.1
   See application file for complete search history.

(56) References Cited

U.S. PATENT DOCUMENTS

| | | | |
|---|---|---|---|
| 6,910,050 B2 | 6/2005 | Pawlick | |
| 7,649,465 B1* | 1/2010 | Vogel | G08B 25/016 340/665 |
| 8,830,068 B2 | 9/2014 | Campbell | |
| 9,538,728 B2 | 1/2017 | Womble et al. | |
| 9,936,680 B2 | 4/2018 | Womble et al. | |
| 10,041,843 B2 | 8/2018 | Zakharov et al. | |
| 10,049,278 B2 | 8/2018 | Womble et al. | |
| 10,555,498 B2 | 2/2020 | Womble et al. | |
| 2004/0230607 A1* | 11/2004 | Pawlick | A01K 29/00 |
| 2007/0221140 A1* | 9/2007 | Warren | A01K 11/008 119/859 |
| 2010/0111600 A1* | 5/2010 | De Bien | A01K 27/005 403/375 |
| 2012/0108989 A1* | 5/2012 | Gargiulo | A61B 5/4362 600/300 |
| 2012/0226751 A1* | 9/2012 | Schwaderer | A01K 11/006 709/204 |
| 2014/0352632 A1* | 12/2014 | McLaughlin | A01K 11/00 119/721 |
| 2015/0334994 A1* | 11/2015 | Prasad | A01K 11/008 340/539.32 |
| 2016/0063188 A1* | 3/2016 | Thornberry | H04L 63/08 705/3 |
| 2017/0095206 A1* | 4/2017 | Leib | A61B 5/14542 |
| 2018/0098523 A1* | 4/2018 | Basom | A01K 11/008 |
| 2019/0254599 A1* | 8/2019 | Young | A61B 5/14532 |
| 2019/0392200 A1* | 12/2019 | Polimeno | G06V 40/16 |
| 2020/0113728 A1* | 4/2020 | Spector | A61B 5/02055 |
| 2020/0359605 A1* | 11/2020 | Maher | A01K 27/009 |

OTHER PUBLICATIONS https://www.twohorsetack.com/p-1865-beta-biothane-affordable-beginner-harness.aspx?gclid=EAlalQobChMI5JSxjaeJ_wIVeQFMCh0BiQDcEAQYASABEgK5nPD_BwEEBAY; Beta Biothane Affordable Beginner Harness; originally accessed Apr. 19, 2023; p. 4.

https://www.nature.com/articles/d41586-019-02143-0 Nature 571, 319-321 (2019) Comment Jul. 18, 2019, originally accessed Dec. 10, 2021; p. 3.

https://apple.news; "How Health and Fitness Trackers are About to Get a lot More Granular" / AgtMj12RATNWXP_ZmYyUYng originally accessed Jan. 12, 2022; p. 12.

Libby Schultz; "Innovating Til the Cows Come Home"; AJ Park; Feb. 8, 2023; p. 3.

* cited by examiner

EQUINE HEALTH AND SAFETY SYSTEM AND METHOD

CROSS-REFERENCE TO RELATED APPLICATIONS

This Non-Provisional patent application claims benefit under 35 U. S. C. § 119 of domestic Provisional patent application U.S. Ser. No. 63/473,540, filed Jun. 3, 2022, the entire contents of which are herein incorporated by reference in their entirety.

BACKGROUND

1. Field of the Invention

Please consider the likes of animals, such as Kentucky Derby Horses, worth millions of dollars and often with syndicated ownerships; would not owners like to know . . . their animals' vital signs and healthy ranges, the ambient temperatures in the stables and out on the training track, the animal's location and exercise regimens?

For example, consider the "winning" (later disqualified) 2021 Kentucky Derby Horse, Medina Spirit; with his health and safety comprehensively monitored and reported, per the following Equine Health and Safety disclosure, likely Medina's ailment would have been monitored, discovered and treated, with Medina put out-to-stud, thereby preserving this valuable equine asset, delivering to the owners a continuing income stream. Sadly . . . Medina Spirit died suddenly during a light work out on the Santa Anita Race Track . . . ownership's equine asset lost to health and safety risks . . . risks addressed by the Animal Safety System of this disclosure. While there may have been some monitors or sensors placed on, or in, an animal during diagnostic testing (e.g., painlessly by a veterinarian per anesthesia), this disclosure is directed to obtaining, from at least one sensor on, in, or otherwise combined with halter/harness/hackamore/bridles, or other trappings as associated with equines, as well as other animals, such as canines and/or felines, or borne by the animal itself (such as a sensor attached directly to the skin of an animal), to generate data from an animal's real time conditions and/or signs, and, if required, amplifying, and then transmitting data to a location remote from the animal, to either be archived and/or acted upon by human intervention, in response to the data.

2. Summary of the Related Art

Halters and hackamores both lack bits and are generally known in the form of a noseband, and a headpiece that buckles around a head of a horse and can be made of various materials, such as rope, leather, or synthetic materials and combinations thereof. The headpiece fits around the poll and behind both ears/around the neck, and the noseband fits around the muzzle. The noseband and headpiece portions of the halter can be suitably joined to each other by straps of leather, rope, or other suitable materials, running alongside the jaw and cheekbone on either side of the head, as well as a lower strap running from the headpiece below the jaw to just below the chin groove to secure the noseband and headpiece portions together. The various portions of the halter/hackamore can be joined to each other by various means, including sewing, rivets, buckles, metal hoops, and other fasteners. A hoop, or other fitment, can be provided on the noseband and/or lower strap in the vicinity of the chin groove for the purpose of attaching a lead rope. Add a bit to a halter and it typically is termed a bridle, exceptions stated, but not limited to text following. A bit in combination with a halter, and/halter-bridle per disclosure text following is within the scope of the halters of the present disclosure.

Halter "nameplates" have also been suggested for placement on a halter, hackamore and/or bridle, the nameplate(s) bearing various indicia thereon. Such indicia may include the horse's name, the owner's identity and/or contact information, or a stable's name, and similar care and custody information and authorizations. The indicia or information carried by these nameplates are fixed at the time of attaching the nameplate to the halter and cannot readily be altered thereafter except by attaching another and/or substitute nameplate with updated indicia thereon. However, as discussed hereinbelow, "Medallions" as disclosed herein, may not only disclose the indicia as heretofore associated with nameplates, but can also provide smart device communications, communication connection codes, information, numbers and symbols, and other indicia far exceeding previous nameplates known in the art.

While halters of various types as bridles have been used for centuries, the functions of such previous halters have been limited to provide a suitable device for controlling movement of the horse during handling. Thus, there has not been any innovation in the form or function of a halter for equine use until the present disclosure.

"Halters," "hackamores," "bridles" are terms utilized in disclosure inclusive terminology in the specification described and illustrated herein. Halters are as likely as old an innovation as animal domestication itself. Also, halter, hackamore and bridle terminology, usage and functions often inclusively overlap, a main operational difference between halter and bridle being the halter is more often used for a walking person to lead or tether a canine/feline and mostly an equine animal, and a bridle-hackamore is more often used by an animal rider to control the ridden equine. The term bridle is also primarily used to describe the device that holds a bit in the mouth of the horse; halters and hackamores generally lack bits. The bridle-halter distinction may overlap, e.g., the Royal Canadian Mounted Police et al. use a halter bridle, that on rest-stops facilitates removing the bit and reins from the horse, without removing the bridle; thus, the terminologys overlap, as most halters do not have bits. As both hackamore horse headgear, and halter headgear, (mostly) lack bits, and are of highly similar-to-same basic design & structure, thereby a hackamore may be seen as an inclusive type of specialized equine halter, thereby fully including hackamores in halter disclosures; as bridles also share commonalities with hackamores, hackamores are also fully included with bridal disclosures, per the following Halters, Hackamores and Bridles disclosure. Hackamores lacking bits, as bridles using bits, are both used for riders' control of equines. Yet while a hackamore gives the rider control of the horse through the nose band aka bosal, by using pressure points on the horse's chin, face and nose, and lacks a bit . . . bridles exert rider control of the horse via a bit. Also overlapping in usage . . . a bosal may also refer to a versatile type of hackamore, more so in the western United States, sourced from Spanish colonial equestrian traditions.

Halter—hackamore—bridle . . . include the inclusive disclosure of relevant tack terminology: Crownpiece aka headpiece . . . cheekpieces . . . poll . . . reins . . . bit . . . Weymouth double-bit bridle . . . snaffle bridle . . . Pelham bridle . . . western bridle . . . barcoo bridle . . . gag bridle . . . halter bridle . . . figure eight bridle . . . jaquima hackamore . . . mechanical hackamore bosal hackamore . . . fiador hackamore . . . mecate rein . . . harness bridle . . . blinders-blinkers-winkers . . . throatlatch-throatlash . . . browband . . . noseband . . . cavesson . . . sliphead . . . frentera . . . bit and bradoon/four reins . . . curb strap . . . bit hobble . . . check rein . . . shank hobble . . . phalerae . . . sallongs.

Key Shared Commonalities/Differences—Halters-Hackamores-Bridles

1) Shared—hackamores (FIG. 1-I), and bridles (FIG. 1-H), provide the equine rider control of the horse;
1) Difference—halters (FIG. 1A-B) provide a walking person a means to lead an animal, small animals too, e.g. canines, felines, etc., yet mostly larger ungulates; halters are not used for rider control of equines/animals.
2) Shared—bridle riders, and hackamore riders (FIG. 1-I), use reins for equine control.
2) Difference—halter walkers use a hoop (FIGS. 1A, B-46) and lead/rope (FIGS. 1B-53) for animal control.
3) Shared—halters (FIGS. 1A, B) and hackamores FIG. 1I) do not use bits for animal control . . . are typically without bits, exceptions below:
3) Difference—bridles use bits (FIGS. 1H-47) for rider control of an equine.
3) Shared—halter bridles, (also termed an endurance bridle or trail bridle) e.g., used by the RCMP (Royal Canadian Mounted Police), Queens Household Cavalry, etc., represent exceptions to the general halter-no-bit and bridle-bit distinction . . . RCMP halter bridles, and similar halter bridles, having quick-release cheekpieces that hold the bit and reins, for no-mouth-bit equine watering, feeding, and rest when tack-n-saddled-up for duty. Such is a source of hybrid halters-with-bits.
4) Shared—halters, hackamores and bridles use behind-the-ears crownpieces/headpieces (FIGS. 1A, B, H, I-42) running over the horse's poll, connecting the strap/rope around-the-neck-head-throat juncture, (a headpiece throatlatch per FIGS. 1H-42, I-42), an exception being the basal-style hackamore that lacks a throatlatch, the basal-style headpiece/strap typically running along both equine cheeks, connecting to the noseband.
4) Shared—halters, hackamores and bridles use side-of-head straps (also rolled or rope material), often termed cheekpieces, (FIGS. 1A, B, H, I-43/44) connecting the headpiece to the noseband-muzzle.
5) Shared—halters, hackamores and bridles use a noseband, (FIGS. 1A, B, H, I-41). Thus, applicant notes 7 commonalities of halters, hackamores and bridles, versus 3, often-overlapping differences, disclosing a single inclusive device group by shared animal control application, function, purpose and use.

SUMMARY OF THE INVENTION

Introduction: The following eleven animal bodily processes and/or systems are included in the Animal Safety System and Method; the animal bodily processes/systems inclusively supplement ownerships/designates/veterinarians Animal Safety System usage. Painlessly per veterinarian-anesthesia devices-monitors-sensors are implanted, and/or ingested and/or inserted, and/or borne by the animal per the stable-tack device-means defined by this disclosure, and-or communicated to computers-devices remote from the animal. Such information is communicated directly, and-or via signal-booster, from the animal, via all smart-sending-receiving communicating and re-communicating devices, equipment, such as antennas, etc. and manners, e.g., frequencies, microwaves, etc. The animals' device-monitored-sensed data-information, is communicated to smart computerized databases, ownerships, designates, veterinarians, platforms, programs, and research-other institutions; devices-monitors-sensors-sources ("DMSS"), generate data-information, communicated directly and/or signal boosted, and/or analyzed-read-interpreted-deciphered by communicating smart devices on-animal, in-animal-body, and/or remote sources from the animal, singularly and per interfaced-integrated platform(s)-programs(s) combination(s). Sources may include various animal-health-safety-life-threatening conditions, e.g., sepsis sensed to tornados-forecast. Communication devices include smart phones-wearables-tablets-laptops-computers, plus communications-signal-boosters and medallions, as defined in this disclosure as smart devices. Animal health and safety bodily processes and systems may be monitored and/or sensed and/or communicated and/or treated in situ=on the animal, and/or in the field, via the present Health and Safety System usage; in situ Health and Safety System usage and/or data-monitorings/sensings and/or health information is supplemented per veterinary in-clinic-office-hospital analyses, evaluations, administration(s) and treatments:

1) Heart, and/or blood, and/or circulatory and/or cardio-vascular, e.g., Medina Spirit's death processes and/or systems;
2) Pulmonary . . . and/or breathing, and/or lungs, and/or respiration, e.g., coughing-contagion—processes and/or systems;
3) Temperature—skin-fur-hair, and/or organs, and/or body-core—processes and/or systems;
4) Temperature—environmental, and/or surrounding, e.g., in automobile, stable, back yard, etc. —impacting healthy-unhealthy-life-threatening bodily processes and/or systems, sourced from animals and/or sourced from prediction-reporting environmental-weather-news institutions-sources, communicated-re-communicated-noticed to ownerships-designates-veterinarians;
5) Organs—e.g., digestive, and/or kidneys, and/or liver, etc.—processes and/or systems;
6) Reproduction—male, and/or female, and/or pregnancy—processes and/or systems;
7) Implants, painless per veterinary-anesthesia, and/or ingested and/or inserted devices-monitors-sensors-sources (DMSS) of animals' bodily processes and/or systems; "sources" as used herein, may include animal-health-safety-life-threatening conditions, e.g. animal-body sepsis-sensed, to remote-from-animal health-safety-life-threatening tornados-forecast, per animal-GPS location, designates zip-code, county, state, regional-other locations.
8) Skeletal—blood-cell production, bone analyses, and/or joints, and/or tendons, etc.—processes and/or systems;
9) Musculature—bone attachments, tendons, e.g., racing-polo horses—processes and/or systems;
10) Brain—spine, and/or nerves—processes and/or systems;
11) Eye—vision, e.g., eye-worm-parasites, etc.—processes and/or systems.

In one embodiment of the invention, the equine health and safety system includes a halter/harness/hackamore/bridle (hereinafter "HHHB") of the invention which can provide sensing and monitoring of the vital life processes and signs of the animal, e.g., such as equines, upon which the halter is placed.

In another embodiment of the invention, vital life processes and signs can be monitored, especially skin temperature of the animal, internal temperature of the animal, pulmonary—breathing/respiration (e.g., coughing), cardiovascular—heartbeat and blood and sweat analysis, etc., and these vital life processes and signs can be archived and communicated to and from a location remote from the animal itself, such as to a veterinarian, research institution, owner(s) database, trainer or other designated custodian of the animal and/or smart computer(s)/communicating device(s) often employing platform(s) and programs(s).

In still further embodiments of the invention, Healthy Life Sustaining and/or Unhealthy or Life-Threatening conditions for animals would be monitored, communicated, databased and/or otherwise acted upon immediately by human intervention and/or automatic treatment. Among such embodiments are:

1. Atmospheric-Environmental Monitorings and Alerts—electrical storms-lightning; hurricanes; tornadoes; pesticides; hail; dust storms (asphyxiation); wild fires (smoke, burns); flooding (drowning); industrial fire pollution, e.g. chemical-refinery fires-emergencies; shelter-in-place urgencies-emergencies; extreme atmospheric-environmental heat and other conditions generally, as monitored-sensed by in-animal-body, on-body, about-body, ambient-to-animal-body devices, and-or provided-reported by media-news-weather reporting-prediction sources, all communications by all means to implicated databased animal ownerships-designates-veterinarians by the Animal Safety System.
2. Temperature Monitorings and Alerts—normal temperature; skin temperature; body temperature; stable or other animal housing temperature; ambient-atmospheric temperature; situational temperature, e.g., in automobile temperature;
3. Respiration-Pulmonary Monitorings and Alerts—normal respiration rate; elevated respiration rate; irregular respiration rate; reduced respiration rate; coughing, disease(s)-infection(s) symptoms; respiration difficulties generally;
4. Heart-Cardiovascular Monitorings and Alerts—normal heart rate; elevated heart rate; irregular heart rate; reduced heart rate; animal cardiology.
5. Optionally—painlessly-via-veterinarian-administered anesthesia animal implant(s) device(s)-monitors-sensors-sources (DMSS) may be provided for bio-chem-other-monitorings/sensings, communicated-read from all sources by all devices, communicated via low-power-signal to a halter-harness-hackamore-bridle borne signal-booster-device(s), and/or communicated directly, and/or to on-animal-medallions, and/or to smart computers-databases-devices-platforms-programs, personal-smart-communicating-devices-wearables, other designates-entities, remote from the animal, per Animal Safety System authorization(s).

In a still further embodiment of the invention, the animal safety system, including an equine safety halter/hackamore/bridle or canine/feline harness, can provide information concerning the environment external of the animal, such as stable or paddock temperature, in-automobile temperature(s), humidity, air quality conditions, including particulates such as dust, air-borne-pesticide, smoke, smog, pollen and other animal health and safety impacting conditions.

In a still further embodiment of the invention, the sensing/monitoring of the animal's vital life processes and signs, the archived and communicated information, and optionally, external ambient conditions vitally impacting the animal, can be combined into determining whether the environment is unsafe for the animal, of use for establishing, maintaining or modifying an exercise regimen, determining periods of inactivity, and be used to plan/alter/reformulate the caloric feed intake of the animal, as well as monitor, analyze and communicate vital aspects of animal comfort, health and well-being, sourced from communicating devices, monitors sensors and database(s).

In even further embodiments of the invention, the equine safety halter/hackamore/bridle can be fitted with an animal locator, such as a global positioning ("GPS") sensor, to identify the location of the animal, including the animal's location within and without zones of safety, zones of danger, or zones outside of predetermined locations, and additionally can therefore be used to locate and recover, a disoriented, missing, or stolen animal. While we generally speak herein of global positioning systems ("GPS") to identify the location of the animal, we are not limiting the scope of this disclosure to only such a system, as it is possible to use other systems to locate an animal. This may be required as an alternative, especially if the current GPS system is compromised or otherwise unavailable. Other animal locating systems can be employed together with GPS, or as an alternative thereto. For example, other technologies, such as triangulation from cell towers; or other systems to locate the animal can be employed, including any improvements to existing GPS. Hereinafter, animal location systems are generically referred to herein as "GPS and/or other technologies"; and applies generally to techniques employed by the Equine Health and Safety System and Method.

In still further embodiments of the invention, "medallion(s)" can be affixed to, or incorporated into, the safety halter/harness/hackamore/bridle. This medallion can carry simple indicia, such as a telephone number, a bar code, or smart phone/device readable QR code or other code-technology. Thus, simple indicia may provide the reader of such indicia, and/or place the reader directly into contact with, the veterinarian or the owner(s) databases, stable or designated care-custody-custodian authorizing entity(s) trainer(s), etc. Further, the medallion may be connected to smart send-and/or receive communications devices, which when activated by a simple gesture [e.g., pressing a button, and/or tapping a smart-device screen, and/or typing instructions into a smart-communicating-device, or other indicia and/or procedures, etc., connects to an authorizing entity, and/or a veterinarian, owner, designated animal-emergency care-custody-custodian(s), etc.]. Alternatively, the medallion(s) can contain an upgradeable memory, and/or communications links via which numerous types of authorizations, data, and information can be included, and communicated, including specific identity information of the animal, (such as retina/eye, DNA/genetic identity/information, including breeding and genetic information and/or other forms/devices of identification) and images of the animal(s)/ownership(s) designate(s), plus care, custody, transport and remuneration authorization information for a lost/missing animal, if/when found and in-system—database(s) authorized ownerships-designates animal(s) urgency-emergencies, and similar health, safety and persons/professional/licensed-care/location/recovery/remuneration authorization(s), and information. Furthermore, the medallion can be used as a device for control(s), such as visual video-images, or a light or series of lights on the halter, preferably light emitting diodes, that can function as visible forward facing and/or overhead and/or on halter/harness/hackamore/bridle illuminating lights, such that the animal can be located by search from the ground or air (e.g., by aircraft, drones, etc.); and/or for path/road illumination, safety and warning lights; or controlling of flashing and warning lights when dusk falls, and/or may emit auditory sounds, such as beeping and/or GPS signaling, and/or other voice or other messages/images, when the animal is surrounded by brush, or otherwise not visible, to assist in locating/recovering an animal, visible or obscured, or in comforting, reassuring and/or calming the distressed animal. The medallion can facilitate communication(s), and also act in conjunction with the GPS and/or other technologies to illuminate the harness lights whenever the animal strays from its GPS designated "safe location(s)," and function as a communication link via the halter-medallion per smart devices to the animals designated care-recovery-authorizing-custodian(s) for out-of-safe-zones-disoriented and/or missing animals; smart communicating devices may also activate lights and/or messages and/or locations to aid in animal location and/or recovery. Miniaturization allows for halters/hackamores/bridles to carry two-plus smart-communications nexus-medallions (as illustrated at 10 in FIG. 1 B and FIG. 6).

In still further embodiments, the safety halter/harness/hackamore/bridle may generate and transmit an alarm and/or smart communicating device message(s) whenever the lead rope is disconnected from the halter/hackamore/bridle, such as when the animal is tethered by the lead rope to a fixed location and unauthorized disconnection of the lead rope from the halter/harness/hackamore/bridle occurs . . . thieves beware. As an option in such an embodiment, upon disconnection of the lead rope, the GPS located in the halter/harness/hackamore/bridle, initiates, and continues obtaining location positions, and in conjunction with the communicating device, apprises the owner, veterinarian, or other designated entity, in real time, the location of the animal.

The animal health and safety system, including equines, safety halter/harness/hackamore/bridle as well as the canine/feline harness of the invention is provided with varied in-animal, on-animal, and ambient-about-animal-body including communicating devices, monitors and-or sensors to deter urine one or more of the foregoing conditions of the animal's vital life processes, signs and health-and-safety-impacting ambient conditions; sensors to determine the environmental conditions external to the animal, including GPS location, illuminating and safety lights, audible sounds, including smart telephonic two-way communications; and such sensors may further interact with implants or ingested/inserted device(s)/monitor(s)/sensor(s)/source(s) within the body of the animal, such as implants or ingested or inserted devices/monitors/sensors/sources being placed with the aid of a painless veterinarian-assisted anesthesia and/or other professional(s), to supplement the vital life processes and signs which can be determined by the sensors external to the animal body located on the body and/or the animal safety halter/hackamore/bridle for ungulates or canine/feline harness all for the lifetime comfort, health, life and well-being of the animal. Via programs and/or platforms, animal health and safety information optionally may be integrated, analyzed, diagnosed to optimize animal comfort and health, and address/treat/isolate/cull infectious disease transmission to other animals and-or humans, e.g., equine Chronic Wasting Disease ("CWD"); use of the safety halter/hackamore/bridle system provides an infectious disease agricultural, veterinary, and public health asset and resource.

An Humane Note: Painless-per-veterinary administration of anesthesia, . . . and only for the health, safety and well-being of equines, canines and feline animals, e.g. life-extending=lifesaving companion-animal kidney-functions bio-chem monitoring; implants per veterinary-anesthesia are solely used to further the health, safety and over-all well-being, plus life-extension=life-saving of the animal, as monitoring bio-chem processes and/or the results of pharma-administrations, and/or per other vital health processes, signs and symptoms, saves animals' lives, as well as prolonging that life and the animals' continued general well-being, e.g. had Medina Spirit benefitted from cardiac-cardiograph plus general comprehensive health monitoring, per implant and/or other devices/processes, (via the health, safety and well-being protocols set forth in this disclosure), he likely would not have suddenly died on the Santa Anita Race Track, during a light work-out. Rather, his heart condition would have been diagnosed, monitored and/or treated, and Medina Spirit's very life and general well-being sustained, as an at-stud "daddy" siring a robust line of nobly pampered thoroughbred foals.

The disclosed embodiments further include methods of conducting the Health and Safety Monitoring(s), as summarized above, and as further disclosed in the preferred embodiments below, for monitoring, sensing, analyzing, in situ, and or transmitting to a location remote from the animal for logging, analysis, diagnosing, administration(s), treatment(s)/procedure(s), databasing, research; notifying owner(s), steward(s), veterinarian(s) and or other designate(s) in real-time, including urgent and emergency noticing, environmental ambient conditions, locating and recovering/care/custody of missing/disoriented animals, as well as other embodiments as disclosed herein, per the Animal Safety System authorizing entity-entities.

Via programs and/or platforms, animal health and safety information optionally may be integrated, analyzed and diagnosed to optimize animal comfort and health, and address/treat/isolate/cull infectious disease transmissions to other animals and/or humans, e.g., equine Chronic Wasting Disease (CWD) and Mad Cow Disease (BSE) in cattle; the safety hackamore/halter/bridle is an infectious disease agricultural, veterinary, and public health asset and resource.

The health and safety of valued animals: Arabian, breeding, polo and racing equines, may be valuable investments, while companion animals, canines and felines, emotionally valuable, often lifetime love-bonded to their stewards, also known as "Pet-Parents."

Equines, and companion animals, are also valued as lifetime-love- and enjoyment-bonded companions, often as "Furry Family Members." Thus, we find canines, equines and felines highly valued health and safety needs are simultaneously highly valued financially and/or per-enjoyment love-bonds e.g., the enjoyed, loved, and financially valuable polo-steed.

Per common, shared value and value extension then, the previously summarized disclosures as to serving the health and safety needs of equines via safety halters/harnesses/hackamores/bridles also fully applies likewise to serving companion animals health and safety capabilities and functions via harnesses . . . resulting in the capabilities and functions of safety halters/harnesses/hackamores/bridles summarized and discussed per the disclosure drawings, also fully inclusive of companion animal harness capabilities and functions, with harness and halter/hackamore/bridle disclosed capabilities and functions applying equally and fully to halters/harnesses/hackamores/bridles.

Additionally, common, shared function and use further unifies companion animal canines, equines and felines, per halters-harnesses-hackamores-bridles common, shared capabilities, functions and use—for animal guidance-control and safety—whether the bridled horse is on the racetrack, for weekend saddle riding enjoyment, or as haltered post-riding stable lead; walking the harnessed dog in city traffic; or keeping harnessed kitty safely in the car during car-door-opening road-trip gas-stops, equine harnesses being employed for animal guidance-control likewise for centuries—all common, shared functional uses for guidance-control and/or animal safety.

These and other embodiments will be explained in further detail when read in conjunction with the detailed description of the preferred embodiments and the appended drawings.

DETAILED DESCRIPTION OF THE PREFERRED EMBODIMENTS

Halters, hackamores, harnesses, and bridles, (HHHB) are configured and used together; equine bridles, and equine bridle-and-harness-configurations, share key characteristics, therewith disclosing a single inclusive device group by shared animal control, comfort, and safety application, function, purpose and use; FIGS. 1A, 1B, 1C, 1D, 1E, 1F, 1G, 1H, 1I and 1J.

Harness uses are also common to, and shared by, equines and canines/felines; as previously disclosed, sled dogs beneficially employ a horse harness, that also distributes pull-weight about the dogs' chest and shoulders, whereas dog-collar-only-usage would restrict sled-dog breathing. A sole dog collar use about an animal's neck generally risks choking and restricts healthy breathing, more so for robust animals, with possible trachea crushing damage; trachea crushing is contrary to this Non-Provisional's Health & Safety Mission. Thus, canine harnesses generally, feline harnesses too, provide "horse harness" health and safety advantages also for dogs and cats.

Figure 6:
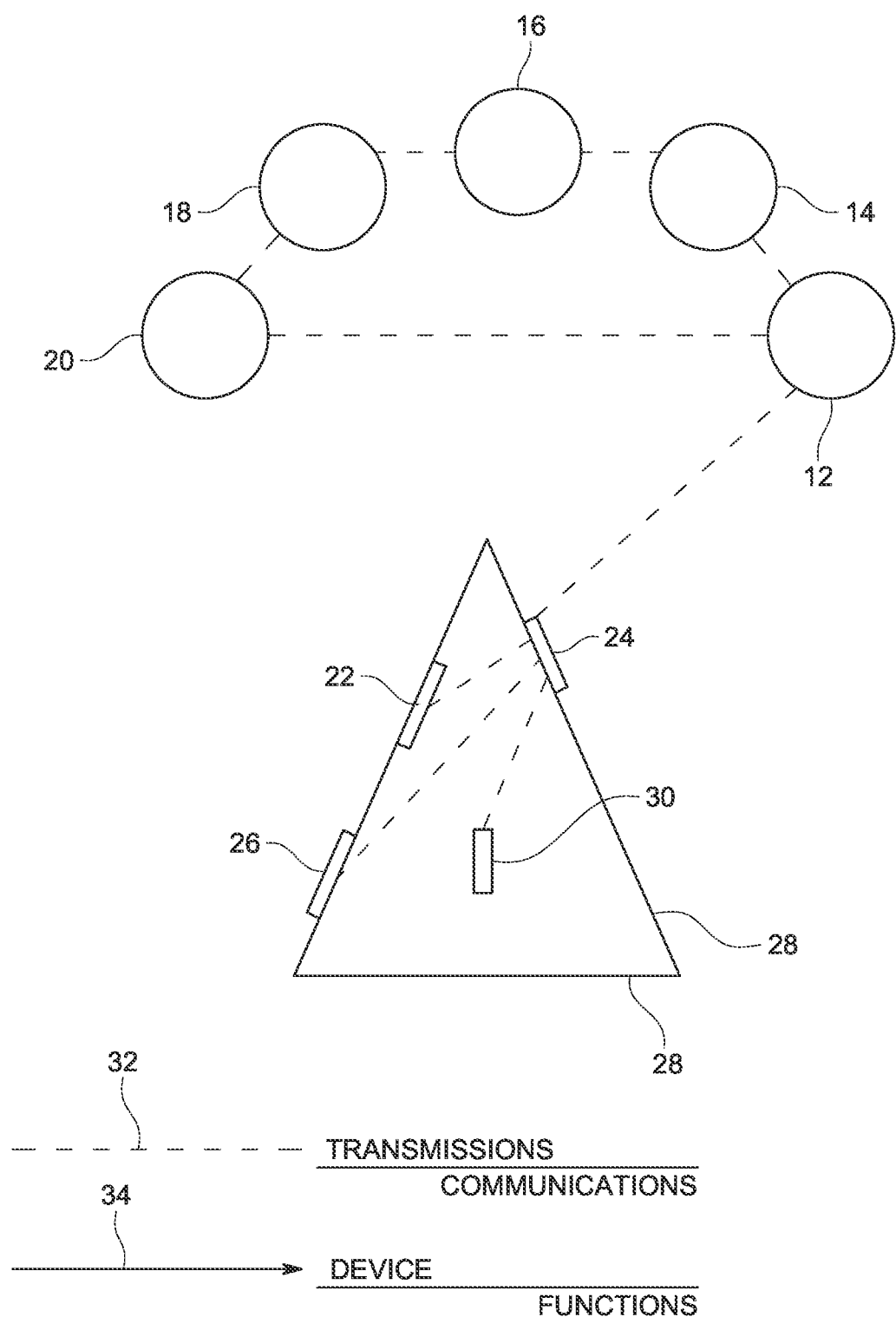
FIG. 6 is a perspective view of a series of devices/monitors/sensors/sources on the safety halter/harness/hackamore/bridle strap of FIG. 2 in combination with a communication system, with the triangle, 28, in FIGS. 6-28, functioning as a schematic representation of the halter 40,—FIG. 1A and FIG. 1B; bridle 50, FIG. 1H and hackamore 80, FIG. 1I.

Additionally, within this single inclusive halter/harness/hackamore/bridle harness device group—by shared animal control application, function, lifetime health & safety purposes, and use—shared devices include: FIG. 1C, 1D, 1E, 1F, 1G, 1J—harness; FIG. 2, 3, 4—halter/harness/hackamore/bridle; FIG. 6—halter/harness/hackamore/bridle.

Benefits of the Present Disclosures:

Public Health Benefits—by broadly employing modern monitoring, measuring, assessment, communications and transmissions devices for the Health, Safety and Well-Being of canines/felines, equines and other animals—early potential professional awareness of animal-to-human zoonotic disease transmissions is enhanced, e.g., monkeypox, mink-Covid transmissions.

Personal Benefits—canines—felines, equines too, become lifetime-love-bonded furry family members, and their well-being sources enjoyment, family fun and long-term companionship.

Economic Benefits—Kentucky Derby-winner Medina Spirit (later disqualified) died suddenly during a light Santa Anita workout; with modern monitoring and assessment means, Medina's health condition would have been known & treated, and the equine asset put out to stud. Sadly, for his death, and sadly for Medina Spirit, his owners/stewards, the horse was lost. Also, mink Covid-to-human(s) transmissions, and Mad Cow Disease, are two examples of the important, and economically plus socially costly intersection of animal-human diseases—both to human health and society, and to the agricultural and general economy.

Wide use of modern Health, Safety and Well-Being monitoring and assessment means, for canines, equines and/or felines, carries enjoyment, family fun and companionship benefits . . . while providing yet another animal-human zoonotic public health resource . . . with favorable personal, family, public health, social and economic benefits.

Figure 1:
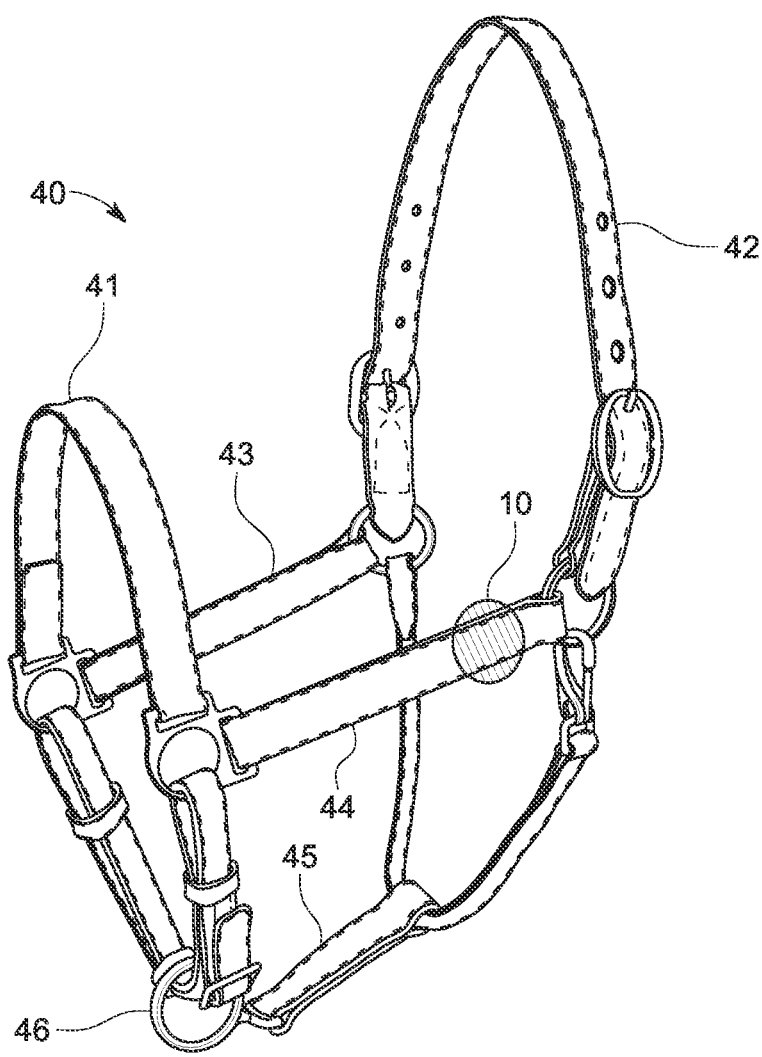
FIG. 1A is a schematic, perspective view of a halter 40 suitable for use as an equine safety halter.
FIG. 1B is an image of an equine wearing one of various typical halter designs.
FIG. 1C is a front-image of a first canine 71 wearing a typical harness design showing strap configurations.
FIG. 1D is a side-back image of FIG. 1C, showing the canine 71 wearing a typical harness-strap-design.
FIG. 1E is a service dog vest harness 62 image on a second canine 60.
FIG. 1F is a one-piece vest harness 63 image on a third canine 61.
FIG. 1G is a military/tactical harness 64 image on a fourth canine 65.
FIG. 1H bridle 50 image illustrating shared components of halter 40 and bridle 50.
FIG. 1I hackamore 80 image illustrating shared components of halter 40 and bridle 50.
FIG. 1J is an image of an equine harness in combination with the equine wearing one of a typical halter, each fitted out with the devices/monitors/sensors/sources of the present disclosure.
Figure 1B:
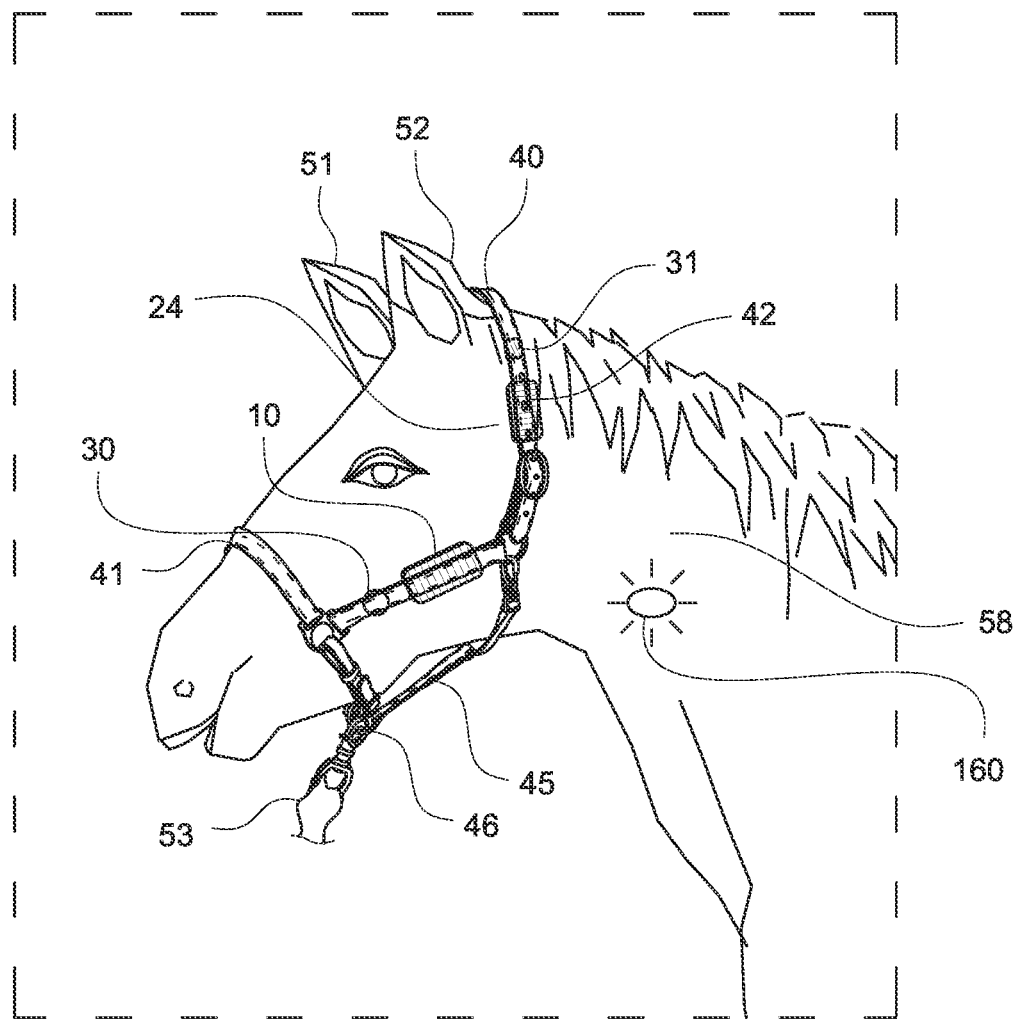
Figure 1C:
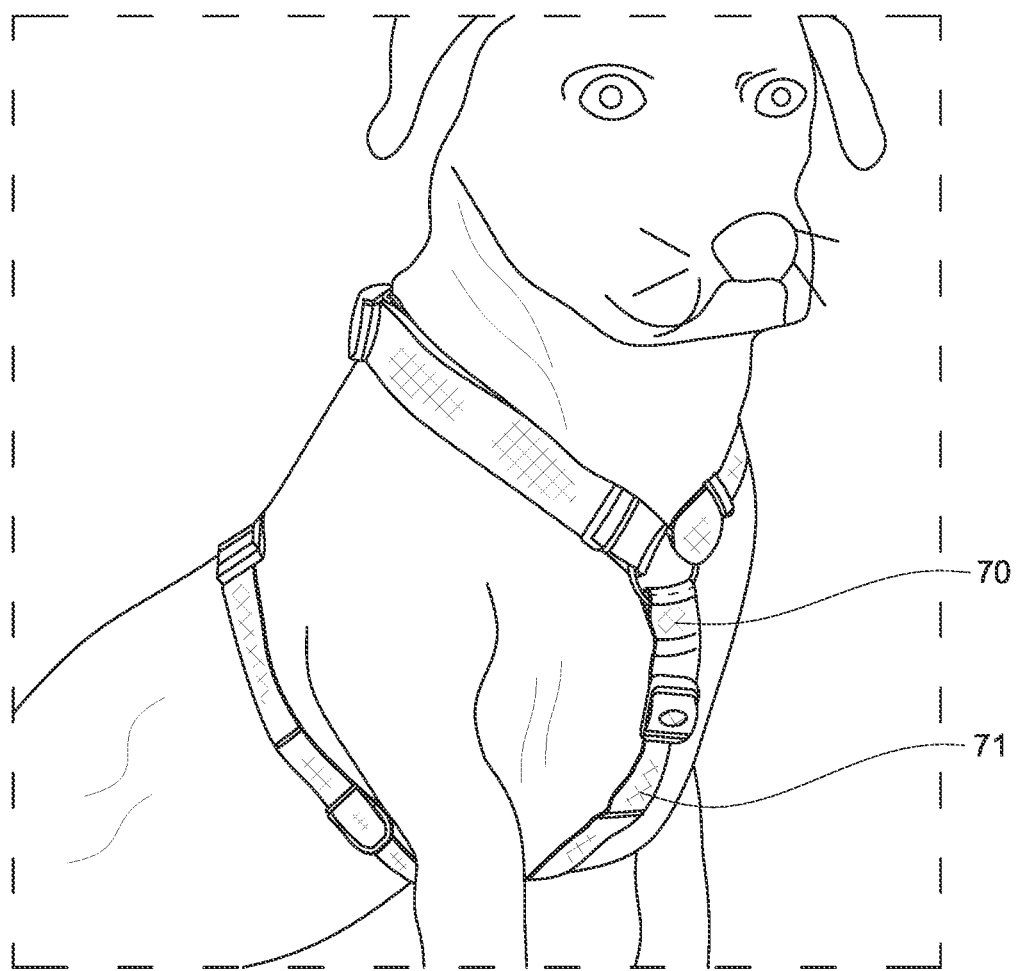
Figure 1D:
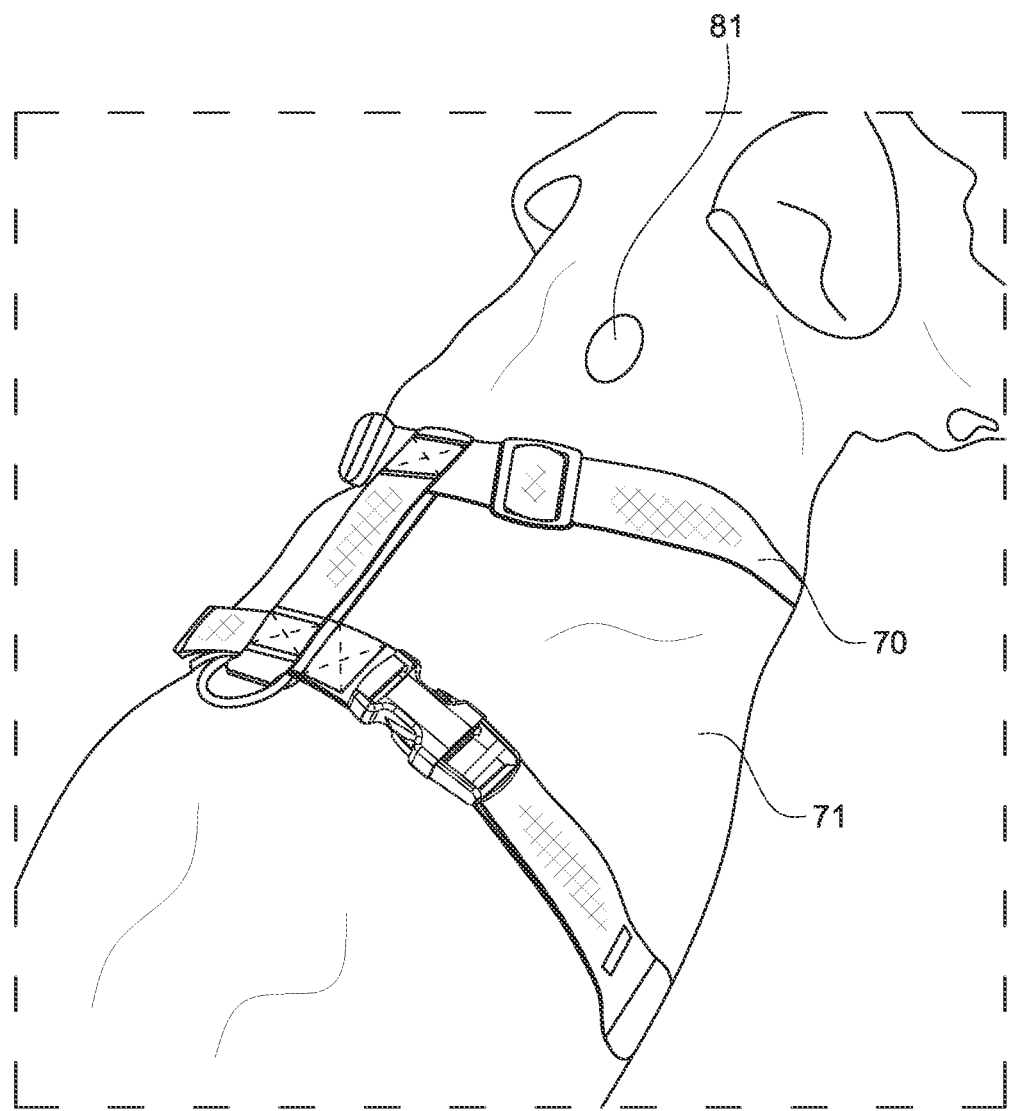
Figure 1E:
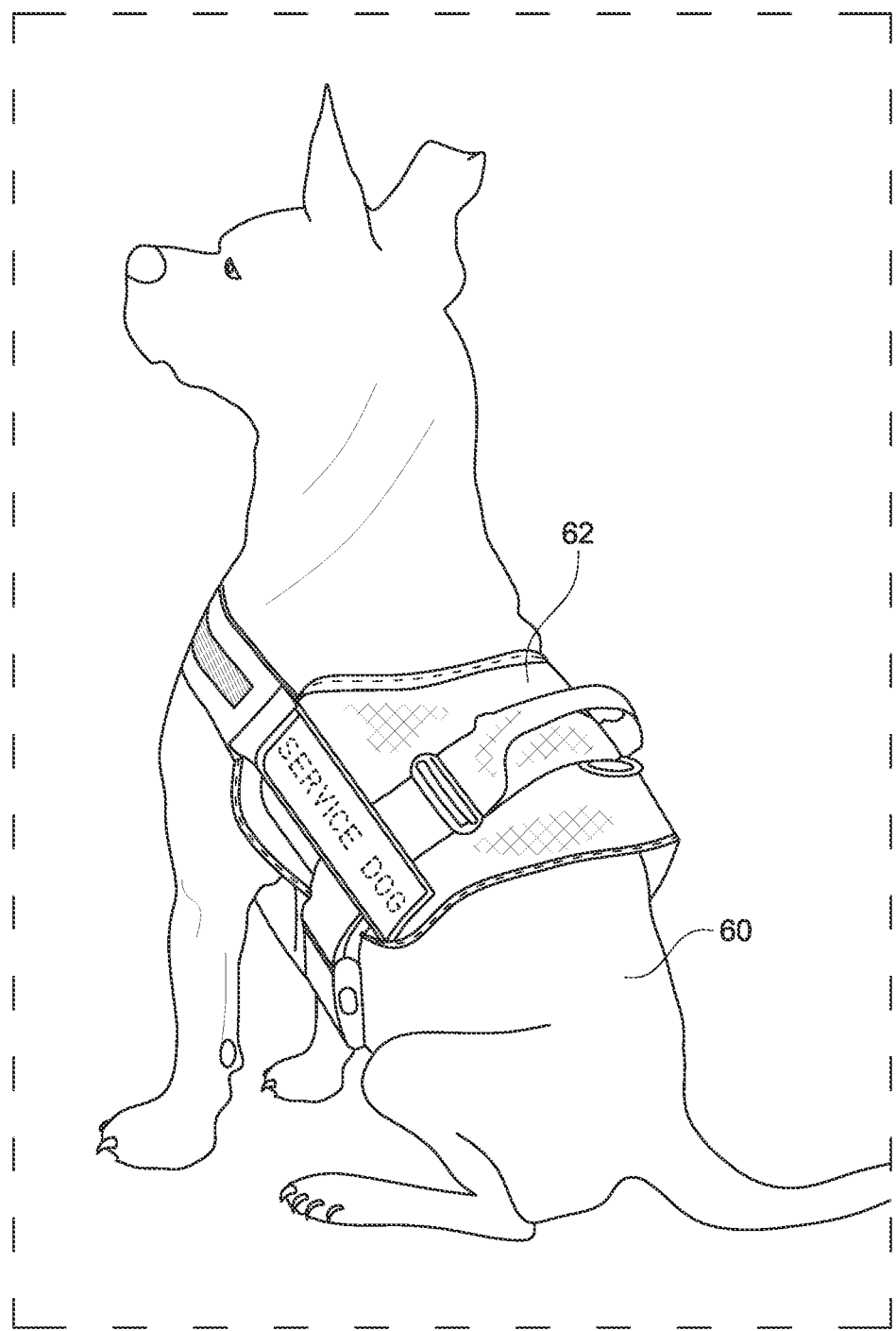
Figure 1F:
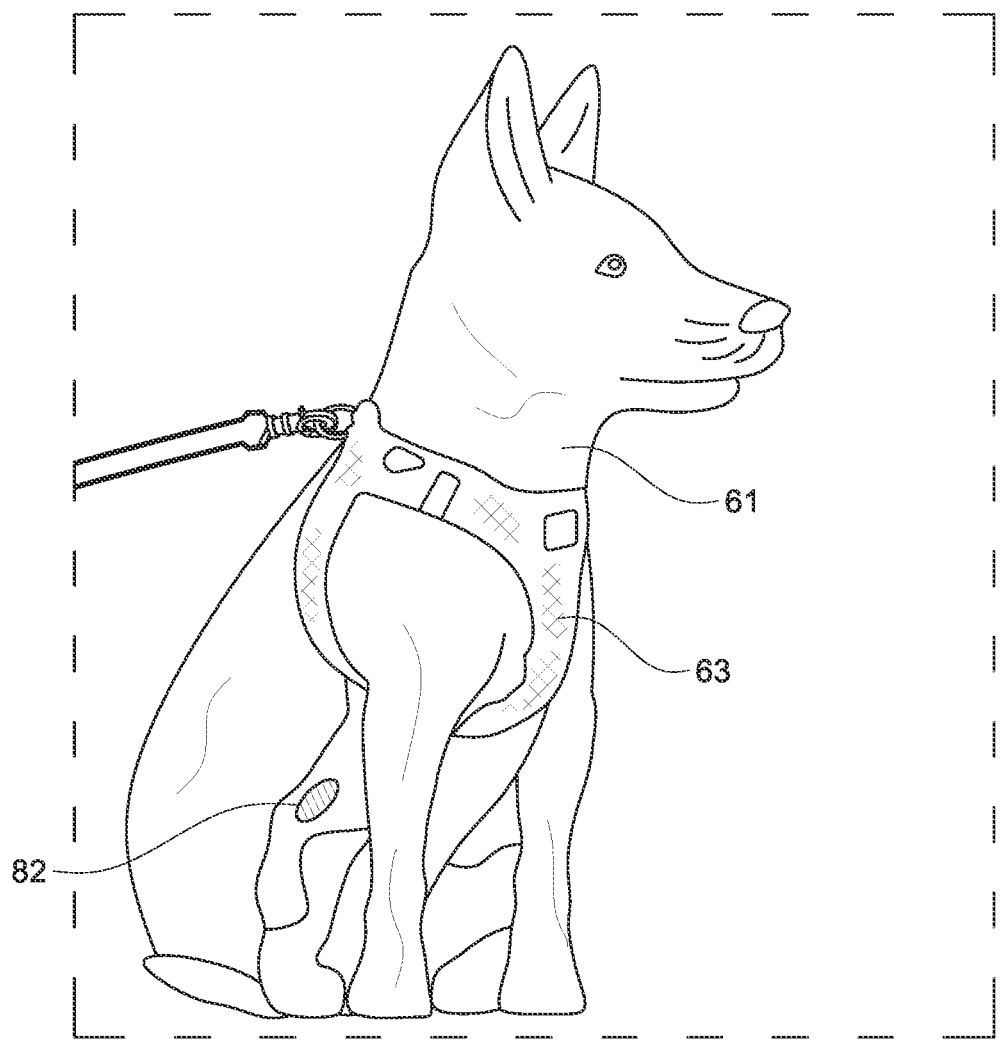
Figure 1G:
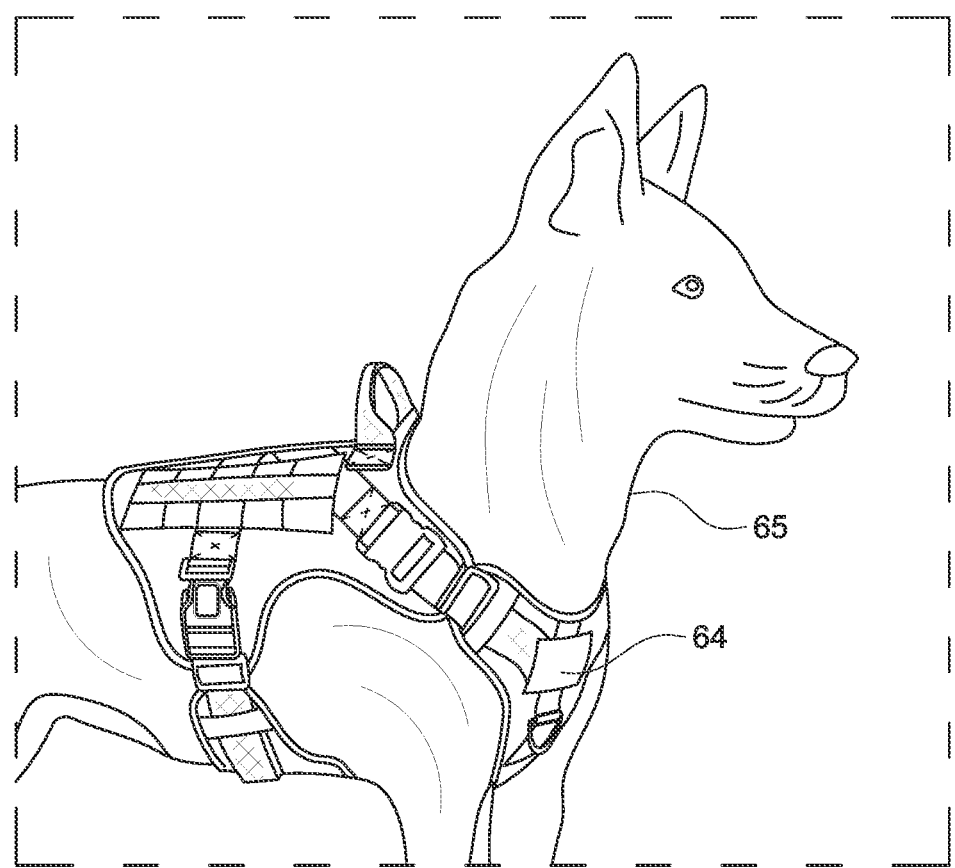
Figure 1:
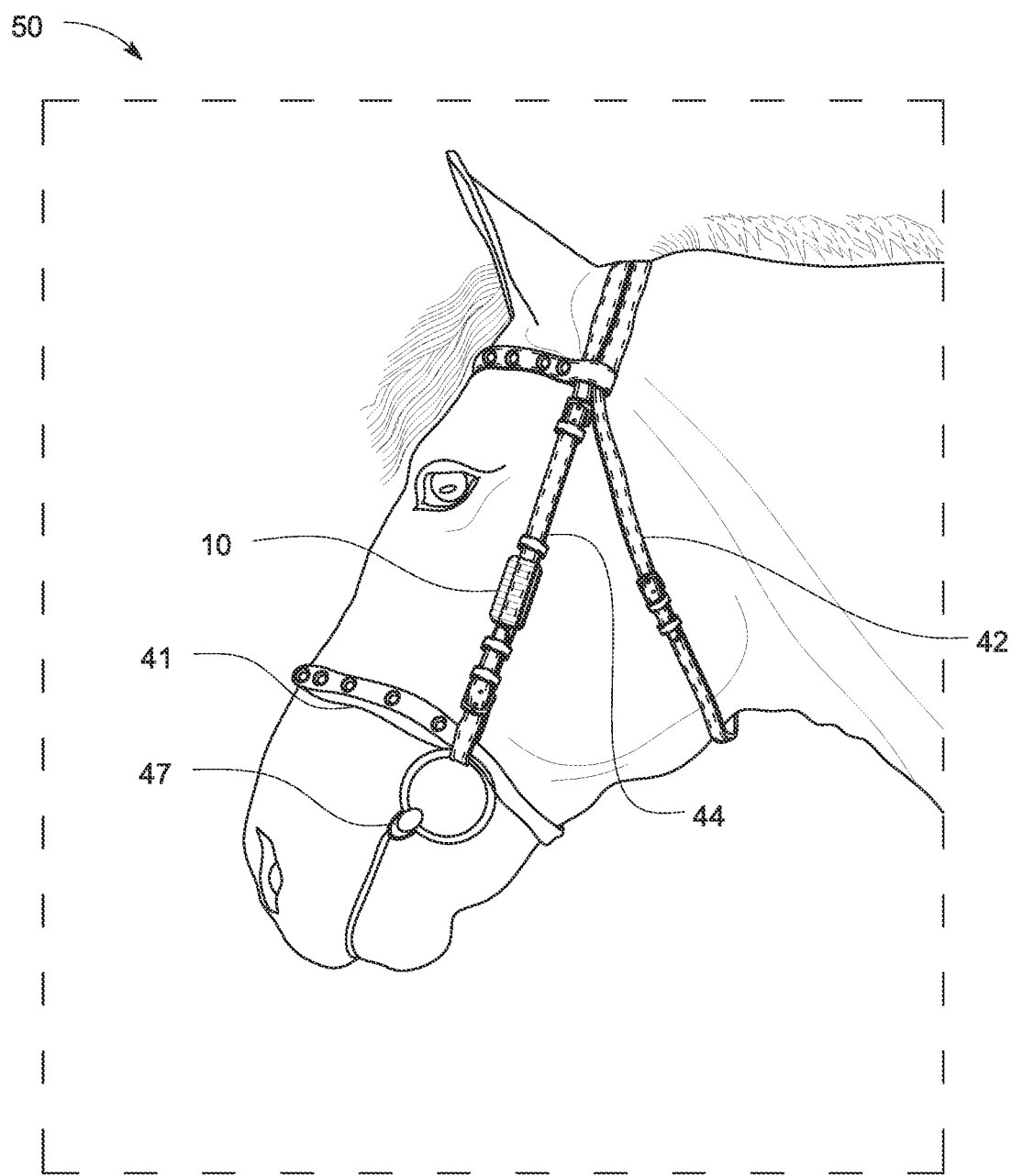

Core concepts of the disclosed methods include the communications-transmissions . . . between health, safety, well-being animal monitoring-sensing devices . . . in body, and/or harness/or otherwise borne by, and/or away-remote from the animal(s) . . . such data-information being generally and specifically relevant to canine, equine, feline animal's lifetime health, safety and well-being . . . and to these animals ownership(s)-professional(s)-designate(s) . . . via smart-computer communicating-transmitting devices . . . and/or via computers-platforms-programs-databases overseeing-processing-surveying monitored-sensed data-information and communicated-transmissions . . . and optionally noticing-communicating-transmitting overseen data-information advisories-messaging to these database(s)-defined-described animals, and database(s) defined-described ownership(s)-steward(s)-professional(s)-designate(s) . . . such animals-ownerships-professionals-designates being database(s)-photo-and-or-video-recorded-identified-defined, per all identification modes and methods, optionally but not limited to retina/eye, DNA/genetic and genetic breeding-lineage information, as well as any animal implanted identification chips, etc. . . . and/or optionally including animal-related-relevant, safety, well-being data-information-records, real-time data-information, including urgent and emergency noticing, and general information . . . optionally monitoring-overseeing-reviewing data-information from-animal-data-information-records . . . and/or optionally messaging-monitoring-noticing animal ownership(s)-professionals-designate(s) about such real-time, and/or animal data-information-records, conditions and situations . . . and optionally noticing-messaging animal(s) ownership(s)-professional(s)-designate(s) about health-safety-well-being related-relevant data-information from-animal-ambient advisories-conditions-information-readings-results, and from government-media-other sources.

Where possible, the same numeral is used to denote the same or similar elements in the multiple appended drawings, (e.g., halter/hackamore and bridle similarities—halter 40, FIG. 1A and elements 10, 41, 42, 44 thereof; bridle 50, FIG. 1H and elements 10, 41, 42, 44 thereof; and hackamore 80, FIG. 1-I, elements 10, 41, 42, 44 thereof). It is also to be understood that the appended drawings are schematic, and are provided as exemplary, but are not limiting, embodiments of applicant's disclosure, and placement of the elements, such as devices/monitors/sensors, Medallions, and other elements on the safety halter/hackamore/harness/ bridle, as illustrated in the appended drawings, are exemplary only and not limiting of the disclosure. Moreover, it is to be expressly understood that the illustrations of the placement of devices/monitors/sensors/sources on the halter 40, FIGS. 1A, 1J and bridle 50, FIG. 1H, or hackamore 80, FIG. 1I, are for exemplary embodiments, and the exact position of the devices/monitors/sensors/sources may be varied for maximum animal comfort as determined by a veterinarian, owner, technical-specifications, and/or designated custodian of the animal to avoid sensitive or uncomfortable positions on an individual animal; to provide maximum signals/samples from the comfortable animal; and to accommodate the max-comfortable placement of multiple, diverse devices/monitors/sensors on the halter/hackamore/ harness/bridle at the same time. Miniaturization allows one, two, or more medallions/devices/monitors/sensors for halter/hackamore/harness/bridle lifetime health, safety, and animal well-being, capabilities and functions.

It is also contemplated that as more advanced nano-micro-bio-chem and other devices/monitors/sensors become available for canines, equines and/or felines that they can be readily incorporated into FIG. 1A halter 40—FIG. 1H—bridle 50, FIG. 1C-1D, 70, FIG. 1E, 62, FIG. 1F 63, FIG. 1G 64, and hackamore 80, FIG. 1I—harnesses of the present disclosure.

Figure 1I:
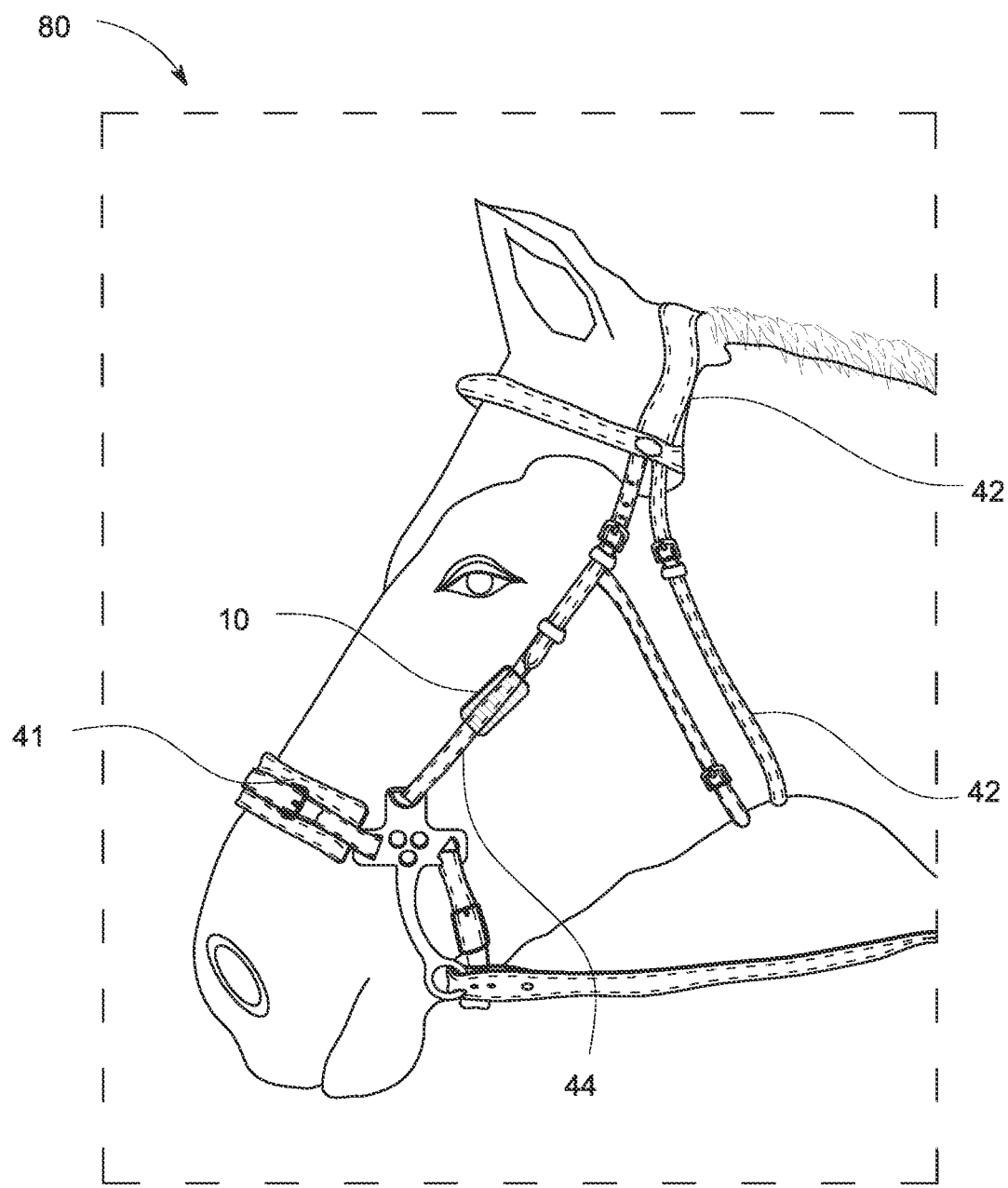
Figure 1J:
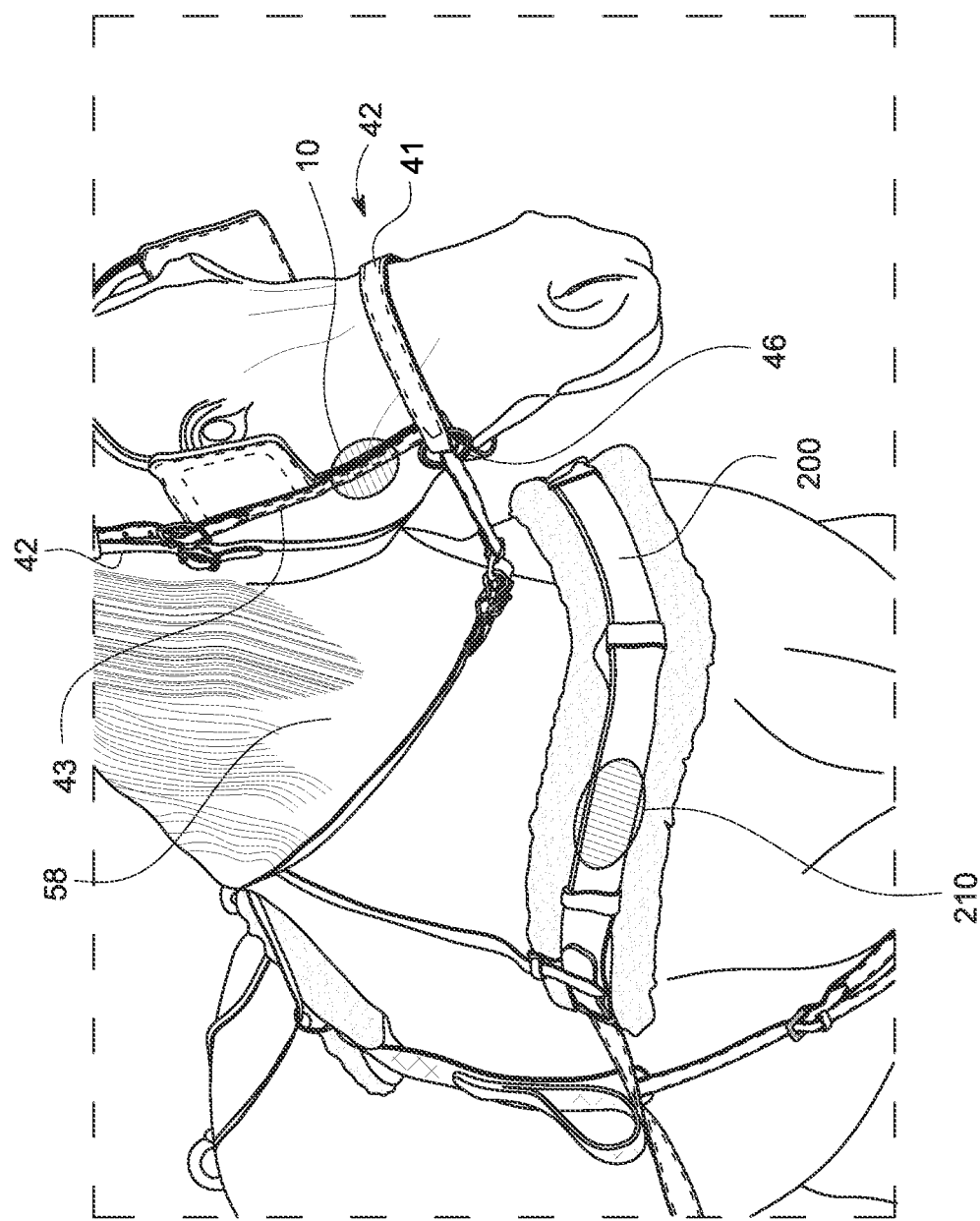
Figure 2:
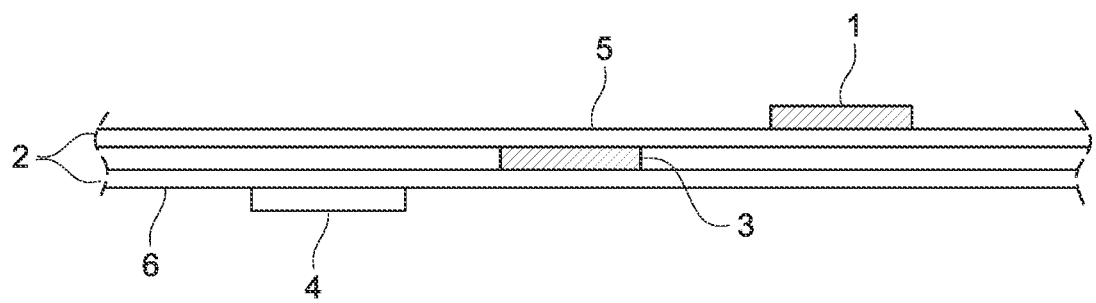
FIG. 2 is a schematic, side, partially cross-sectioned view of the double-straps of health and safety halters/harness/hackamores/bridles for equines, harnesses for canines/felines, showing devices, monitors, sources and/or sensors positioned on halter/harness/hackamore/bridle straps away from the animal, between inner and outer surfaces of the straps, and against the animal.

Further, the present disclosure of the Equine Health and Safety System disclosed herein is not limited to those types of halter, hackamore, harness or bridle as illustrated and described herein, but can be combined with any conventional trappings as known in the art, such as any body-covering (or partial-covering) trapping used, such as the harness illustrated in FIG. 1J, which is a beginner's harness due to its simplicity, but more robust harnesses for draft animals, such as horses, donkeys (including burros), mules, oxen, water buffalo, elephants and other beasts of burden pulling harnesses; and even other "tack" for such animals, such as the body-covering "horse-blanket." It should be expressly understood that the term "body covering" does not require a complete covering of the animal's body, it being sufficient that at least a portion of the animal's body is covered, such as a halter/hackamore/bridle on an equine, canine-feline harnesses too, but also includes a body covering that is supported upon an animal's back, as well as in some embodiments, even covering the animal's extremities.

As can be seen in FIG. 1A, a halter 40 is provided with a noseband 41 for fitting around the muzzle of an equine 58 (a horse as shown FIG. 1B). A headpiece 42, FIG. 1A is connected to the noseband 41, by a righthand strap 43 and a left-hand strap 44 connecting to the noseband; the headstall fits around the poll and behind both ears 51, 52 of the equine 58, as shown in FIGS. 1B and 1J. Lower strap 45, is also connected between the headpiece 42 and noseband 41. A hoop 46 is provided as the noseband 41 for connection of a lead rope 53 (shown in FIG. 1B) to halter 40, FIG. 1A, 1B, for a walking person to safely guide the equine.

Bridle 50 (FIG. 1H), including bit 47 illustrates the similarities between a bridle 50 and halter 40, FIG. 1A; 10, 41, 42 and 44 are alike components of halter 40, FIGS. 1A-1B, and bridle FIG. 1H; equine halter/hackamore and bridle capabilities and functions are disclosed as equally and fully including canine harnesses, as shown, e.g., in 70, FIG. 1C, -1D, 62, FIG. 1E, 63, FIG. 1F and 64, FIG. 1G; and feline harnesses (not shown). Hackamore 80, FIG. 1I also shares similarities with halter 40, bridle 50, and it should be understood that a structure/function/sensor/probe(s)/medallion(s) described in connection with any one of the halter hackamore 80 and bridle 50 may also be shared among each of halter 40, bridle 50 and hackamore 80, likewise with harness FIGS. 1C, 1D, 1E, 1F, 1G and 1J.

The materials for the headpiece 42 are preferably natural or synthetic leather, or other suitable materials, for the purpose as will be described below. The right-hand strap 43 and the left-hand strap 44 can also be made of natural or synthetic leather, or of natural or synthetic fiber materials. The noseband 41 and the lower strap 45 can be made of the same or different materials as the right-hand strap 43 and the left-hand strap 44. Halters 40, bridles 50, and hackamores 70 are made of a wide range of any and all materials, harnesses too, from knotted rope, often leather and/or synthetic straps, rolled materials, to finely tooled and expensively decorated leather bridles, hackamores and halters; halters/hackamores and bridles (and harnesses also) may have narrower straps, rolled materials to broad straps and cushioned/padded and/or companion animal body-covering designs, made from a vast array of suitable materials per animal comfort. Halters/hackamores are very comfortable for animals, harnesses also, as they can eat, graze and water freely. As noted, an animal halter that adds a mouth-bit is generally termed a bridle, and is expressly encompassed by the term "halter" in the appended claims. The close similarities shared by bridles-hackamores and halters-harnesses are disclosed per FIGS. 1A-1B and FIGS. 1E 1J.

As shown in the cross-sectional view of FIG. 2, an away-from-body surface 5 of halter 40 shown in FIG. 1A, or harness 200 shown in FIG. 1J, can contain external sensor 1, FIG. 2, which can be used to determine conditions external to the animal, e.g., weather, temperature, noise (e.g., sensing contagious coughing), pollution, pesticides; and can be attached to the exterior surface of halter 40, FIG. 1A, e.g., to the exterior surface of headstall 42. A sensor or other device 3, FIG. 2, can be included between the exterior surface 5 and interior surface 6 of headstall 42, FIG. 1A; finally, a near/against the body sensor 4, FIG. 2 can be included on the interior surface 6 of headstall 42, FIG. 1, or elsewhere, such as the interior surface of harness 200, FIG. 1J, to obtain vital life processes and signs directly from the animal. In FIG. 2, device 3 can be a GPS, or other location sensor, to monitor safe and unsafe areas as well as for general location tracking positioned internally between the exterior surface 5 and interior surface 6 of the halter/hackamore/bridal which prevents tampering with the GPS or other location sensing device, unlike the sensor 4, which should be located in the headpiece 42, FIG. 1A, sensor 1, FIG. 2 can be located on any of the right hand strap 43, FIG. 1A, and left hand strap 44, as well as lower strap 45. Additionally, the halter/hackamore/bridle can comprise an electronic lock to lock the halter/hackamore/bridle upon an equine to prevent removal of the halter/hackamore/bridal from the equine. The electronic lock can be locked and/or unlocked remotely by at least one of a smart communicating device, a communicated code or a message. (FIG. 2 disclosure includes halter(s), hackamore(s), bridle(s) and harness(es) usage). Each of the sensors described herein may also contain a clock. The clock can be used to timestamp the data as collected. Sensors may also be devices and/or monitors in stable and/or ambient or remote. Such vital life processes and signs may include, without limitation, skin temperature, sweat analysis for equines (including without limitation, cell health and organ functions through use of electrolytes other processes; immune system such as cytokines; drug interactions, such as metabolites; chlorides, lactate, urea, glucose, creatinine, alcohol, pH conditions, protein and hormone levels and presence of heavy metals) blood pressure, blood glucose readings, heart rate, cardiac rhythms/cardiograph/cardiology, breathing rate/monitoring, motion, and other vital life science patterns, processes and signs, health and safety assessed and monitored per platforms and/or programs and/or persons-professionals-entities. Therapies are also affected, such as creating skin sensations, such as vibrations, or electrical or thermal or other effects to rehabilitate and calm the animal (such as during transport, or in a cold environment), as well as the in situ or otherwise administration of drugs (e.g., pain, motion sickness, high blood pressure, diabetes, etc.). It is estimated that some 25 percent of canines are regularly walked in conditions too cold, wet, or otherwise unhealthy for the animal. The animal health and safety disclosure herein, provides for the sensing of various parameters of an animal's skin and/or core temperature, and heating elements can be provided in various types of animal body coverings, the heating elements being manually or remotely actuated in response to the transmission of the animal's skin and/or body temperature, and/or other sources of environmental and other conditions impacting animal health and safety. Thus, monitoring the temperature of the animal, and through the application of therapies, such as heat imparted by thermal effect, would aid the animal(s)' safety and well-being. Currently available bio-chem and micro nano-technology and micro/nano-electronics, and other current and emerging technologies, combined with legacy veterinary methods, pharmacology, procedures, remedies, technologies and treatments, are dynamically joined and/or integrated to support complex animal health and safety administrations, analytics, diagnostics, functions, platforms, programs and research via the equine safety halter/hackamore/bridle and/or canine/feline companion animal harness, for the maximum enjoyment, comfort and well-being of highly financially valued and/or lifetime-love-bonded companion animals, per the Equine Health and Safety System.

In FIG. 2, device 3 can be a GPS, or other location method and/or sensor to monitor designated safe and unsafe areas as well as for general location tracking positioned internally between the exterior surface 5 and interior surface 6 that protects and prevents tampering with the GPS or other device; unlike the sensor 4, which should be located on the headpiece 42, FIGS. 1A, 1J, sensor 1, FIG. 2 can be located on any of the right hand strap 43, FIG. 1A and left hand strap 44, as well as lower strap 45, or on various portions of harness 200, FIG. 1J. FIG. 2: Single and/or multiple device(s) and/or monitors, and/or sensor(s), are optionally positioned on the halter(s)/hackamore(s)/bridle(s)/harness(es) for optimum humane animal comfort, functioning and performance, per veterinary and technical expertise, to maximize the overall lifetime comfort and well-being of animals, both individually, and as groups, per database and/or zip code, county, state or region.

Figure 3:
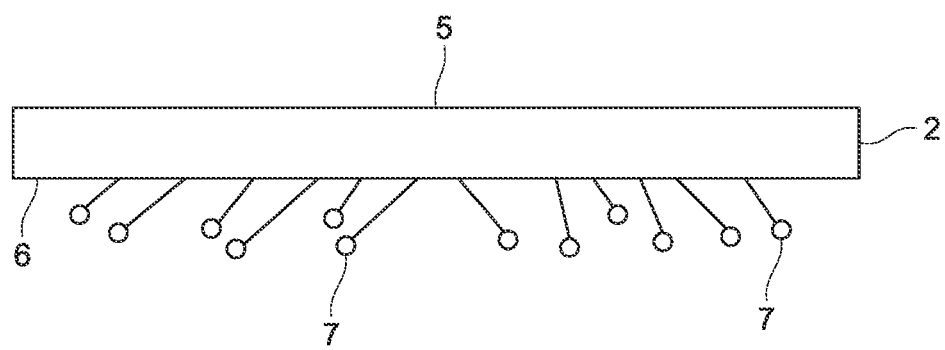
FIG. 3 is a schematic, halter/harness/hackamore/bridle strap, end, cross section view of the FIG. 2 strap, enlarged to show detail of the devices/monitors/sensors/sources (DMSS) of the health and safety halter/harness/hackamore/bridle straps of FIG. 2.

FIG. 3: Illustrates an enlarged view of the plurality of slender, small probes 7 that optionally protrude multi-directionally, via various lengths, constructions, and dimensions, from interior/against-the-animal surface 6 of headstall 42, FIG. 1A, or optionally other comforts-and-functions maximizing location(s), against and comfortably through-to-against skin of the animal's fur/hair, for through the fur/hair multiple contacts with the skin of the animal(s), from which the various device(s)/monitor(s)/sensor(s) vital life processes and signs are obtained, analyzed, communicated, diagnosed, monitored and/or recorded and/or assessed per platforms and/or programs, optionally interfaced and/or interconnected. Although a single probe is operative to obtain a single condition/measure of the animal, e.g., temperature, it is preferred to utilize multiple probes 7, even if the function of each of the probes 7 is to obtain averaged and/or confirming information on the same condition/measure. The disclosures of FIGS. 2-3 are generic to and includes halters/hackamores/bridles/harnesses as shown in FIGS. 1A-1J.

Figure 4:
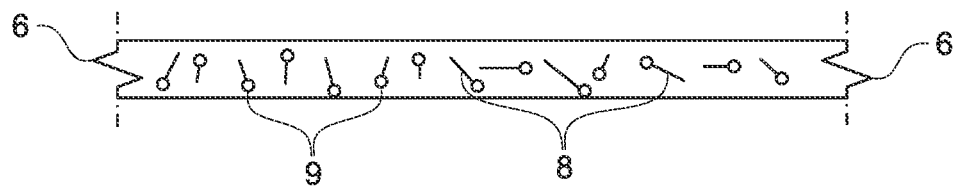
FIG. 4 is a schematic, underside view of the halter/harness/hackamore/bridle strap of FIG. 3, taken from the view with the devices/monitors/sensors/sources of FIG. 3 being against the animal.

FIG. 4: illustrates the flexible multiple probes 8 of different lengths 9, optionally of differing constructions, dimensions, functions and placements for maximum animal comfort and device functioning, directed through the fur/hair of the animal for comfortable, gentle, multiple skin contact(s). Of course, when multiple gentle probes are used, each of the individual probes 7 may be used to obtain different types of information, e.g., one type of probe 7 to obtain sweat samples and another type of probe 7 to detect cardiac rhythms. Additionally, multiple sensors may be used to obtain different types of information, e.g., a separate sensor for heart rhythms and a separate sensor for sweat samples, and/or multiple probe-measurements of the same bio-chem and/or other differing functions and measurements, for measurement confirmation and/or measurement averaging and/or other measurement capabilities and functions. Multiple comfortable probes can also be used for like functions and measurements, as noted hereinabove, for averaging, back-up, and confirmation of measurements/readings. As described hereinabove, the sensor 4, FIG. 2 works directly from the information comfortably obtained from the skin of the animal and/or an analysis of its secretions (e.g. sweat for equines), communicated directly to smart-communicating/transmitting computer devices platforms and/or programs and-or via signal-booster-transmitter 24, FIG. 6 (and/or via 10, FIG. 1A) However, sensor 4, FIG. 2 can also work in conjunction with internal sensors 30, FIG. 6 (per veterinarians, painlessly-per anesthesia surgically implanted and/or ingested and/or inserted, as will be discussed in connection with FIG. 6).

It should be understood that the single and/or multiple device(s) and/or monitors, and/or sensors sources FIGS. 3-4, and its respective probes 7, 8, 9 can be arranged and modified for multiple uses other than monitoring/sensing. For example, in order to sooth the animal, the probes 7, 8, 9 can be used to impart relaxing electrical and/or therapeutic-mechanical care and comfort for the animal, together with sound inputs from medallions 10, FIGS. 1A and 10, 24, FIG. 1B to comfort and calm the animal to preserve its well-being, especially during times of stress, as when the animal is out of its safe-zone, being transported home, etc.

Figure 5A:
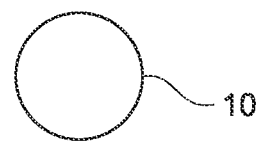
FIG. 5A is a schematic, front view of a medallion(s) 10 to be fixedly attached to the halter 40, in FIGS. 1A, 1B and 1J; bridle 50 in FIG. 1H, hackamore 80, FIG. 1I, and medallion 210 fixedly attached to harness 200, FIG. 1J.
Figure 5B:
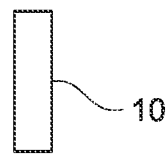
FIG. 5B is a schematic, side view of the medallion(s) 10 of FIG. 5A; medallion(s) are positioned-first per maximum animal comfort, and second-per veterinary assessment, and/or technical requirements.

FIG. 5A: illustrates a schematic, front view of a medallion 10, FIG. 5B illustrates the medallion 10 of FIG. 5A in a side view (also 10 in FIGS. 1A and 1B). The medallion 10, FIG. 1A, is preferable permanently mounted on one of the right-hand straps 43, FIG. 1A and/or left-hand straps 44 by permanent fasteners, such as rivets (not shown) in order to prevent removal thereof from the halter 40. Although we have illustrated the medallion 10 as a single device, with multiple functions, it is also within the scope of this disclosure to use two, or more than two, devices to perform the functions attributed to medallion(s) 10, 24, 210 and multiple other nexus functions. Each of the medallions 10, 24, 210 can also include a clock to record receipt of the data from any of the devices/monitors/sensors sources disclosed herein and time stamp data collected, data transmitted, data received, or any other use of medallion(s) 10, 24, 210, such as if/when the code(s) on the medallion were accessed and/or read. For example, the communication(s) which are carried out to communicate data can be achieved by a separate communication(s) device which can be a transmitter, a receiver, and/or a transceiver, any of which can be a function of the medallion(s) 10, 24 and/or 210. Additionally, signal(s) from the various sensor(s), monitor(s), reader(s), or other data gathering devices, may individually, or collectively, be subject to signal processing to transform or convert the data/information. For example, signal processing may include the steps of amplification, filtering, compression, integration, and delay, continuous and discrete time signal processing, and other analog and/or digital signal processing known in the art and may be included as part of the medallion functions. The signal processing can be performed by a digital circuit, a computer, or other technology. A second medallion 24 in FIG. 6, 210 in FIG. 1J, and 10 in FIG. 1J can be used together on the same halter/harness/hackamore/bridle; the medallions 10, 24, and 210 can carry and communicate and receive indicia, such as a bar code, or smartphone/device readable QR code, or other smart communicating/computer device readable codes and/or voice/text messages and/or other sent/received communications or codes or technologies. The indicia may provide the smart-device reader/entity of such indicia and/or place the reader entity directly into contact by-all-communications/frequencies/microwaves, etc. transmission devices with authorized veterinarian(s)-professional(s) entities or the owner(s), stable and/or authorized/designated aid and custody custodian(s), trainer(s), or care-center(s) authorizing/locating/recovering/remunerations for out-of-GPS safe-zones/lost animals, and other animal urgencies emergencies, including per computer-telephony, etc. Further, the medallions 10, 24 or 210 may be connected, via various communication(s) and transmissions, such as wired and/or wireless networks, satellite, cell tower, and other/all signal processing equipment-communicated to smart computing and/or communicating smart devices, which when activated by a simple gesture (e.g., pressing a button, and/or touching smart device keys/screens, and/or scanning/typing a smart-device code/message/number text or per other indicia and/or instrumentalities) connects to a veterinarian, owner, and/or designated authorized and care-lost-missing-recovery-custody-custodians and/or via computer-telephony and/or persons entities, etc. Alternatively, the medallion(s) 10, 24, 210, can also contain a memory component, preferably an upgradeable memory, and/or other capabilities in which numerous types of communication information can be time stamped, received/included/stored/transmitted, the medallion(s) 10, 24, 210 functioning also as a smart communicating-and-sending/receiving device nexus for enjoyment, health, and safety, connecting to a specific ownership(s) or animal(s) databased identity(s), for Animal Health and Safety System authorized care, custody/transport information and instructions for the animal(s), when in an urgent/emergency/unsafe situation, and/or other optionally real-time animal health and safety communications, and/or animal-specific and/or general veterinary information, and/or other databased information and/or records relevant to the animal(s) ownership(s)/custodian(s) designate(s). The medallions 10, 24 can include information for the animal if lost/missing when found, and/or located in a designated-unsafe/lost GPS locations, and/or other real-time animal health and safety communications and/or animal-specific and/or general veterinary information and/or other archived information and/or records relevant to the animal ownership/custodian. Furthermore, the medallions 10, 24, 210 can be used to control ambient video and/or other visual images, also controlling a light or series of lights 30, 31 FIG. 1B, on the halter/hackamore/bridle/harness, preferably light emitting diodes than can function as visible forward facing and/or overhead illuminating light(s), device(s)/sensor(s) optimally positioned optionally per the max-comfort and well-being of the animal, breed and species, such that the animal can be located by search from the ground or air (e.g., by aircraft and/or drones); and/or warning/signaling lights and/or for all herein disclosed functions/operations a smart computing/communicating optionally wearable halter/harness/hackamore/bridle device(s), and/or controlling flashing and/or warning lights when dusk falls, and/or may comprise a speaker to emit auditory sounds, such as beeping, and/or voice messages generally, and/or when the animal is surrounded by brush, or otherwise out of sight, to assist in locating/recovering the out-of-GPS, and other location technology, safe-zones missing animal(s) and/or other animals in urgent/emergency and/or unsafe conditions and/or situations, and/or other functions, purposes and services. Medallion(s) 10, 24, 210 can act as senders and/or receivers of signals to perform any function on the animal, such as turning on the lights or speaker, energizing the thermal, vibratory, or medicament administering device in contact with the animal (including topical, transdermal, subcutaneous, or internal of the animal pharmaceutical, hormone, antihistamine, or other pharmaceutical and/or medicament, and/or other actions, procedures, treatments). The medallion(s) 10, 24, 210 can also act in conjunction with the GPS in multiple ways, including to illuminate the harness lights, video, or initiate other action on the animal, whenever the animal strays from its electronically/otherwise designated "safe location," and/or a smart communicating device may activate halter/harness/hackamore/bridle lights. A read/write/re-programmable memory within the medallion(s) 10, 24, FIG. 1A, 10, 210, FIG. 1J, can be updated upon change of circumstances (e.g., new veterinarian(s) or designated authorized care/custody/recovery/custodian(s)/entity(s), and/or a new authorized care-center(s) is designated, calling for new communication and/or transmission arrangements). The medallion(s) 10, 24, 210 may also be programmed to change the contact communication sending/receiving information, (e.g., telephone, email address, per all communication antenna, equipment, devices, frequencies, (e.g., microwaves) and modes, both specifically and generally for this disclosure, etc.) of the authorized and authorizing care/custody custodian(s) and/or contact entity(s), as well as function as a human/animal enjoyment, health and safety communications and monitoring per real-time, and an animal-ownership-designate information and records archived nexus to maximize the comfort and well-being of the animal. While we have illustrated one medallion 210 on harness 200, and up to two medallions 10, 24 on the same halter 40, there may be multiple medallions on a single animal, especially where the trappings/tack for equines, and/or the harness(es) for canines felines, provides additional points of attachment for multiple medallions on animal control and restraining equipment, trappings tack, as shown in FIG. 1J. Alternatively, as described above, the functions of a single medallion 10, or the functions of multiple medallion(s) 10, 24, 210 may be separately carried out by multiple devices, without departing from the scope of the instant disclosure.

When linked with a two-way smart computerized-communicating device(s), preferably a smart phone/tablet/laptop/computer and/or personal wearable device and/or assessing/analyzing platform(s) and/or program(s), the medallion(s) 10, 24 FIG. 1A, also 24, FIG. 6, 210, FIG. 1.1, can be activated to enable two-way voice/email, SMS or other communication(s)/transmission(s) devices/modes with a designated/databased and/or real-time contact(s) with persons or entities. A two-way technology medallion communication device, optionally in addition to the medallion(s), may be attached to the halter/hackamore/bridle/harness or carried by the animal, and/or that may be at a position(s) remote from the halter/hackamore/bridle/harness animal and/or medallion(s) 10, 24, FIG. 1A and 24, FIG. 6, 10, 210 FIG. 1J, and can be included in all halter/hackamore/bridle/harness embodiments and usages.

The thickness of the medallion(s) 10, FIG. 1A, (and/or 24, FIG. 1B) also as shown in FIGS. 58, and 24, FIG. 6, 210, FIG. 1J, may be made variable to house all the multiple possible power source(s) (e.g., battery(s), etc., or other power sources) and micro/nano- and -other circuitry, such as signal processing, other technologies necessary to permit all of the medallion's enjoyment, health and safety real-time and databased communication(s)/transmission(s) nexus tech-capabilities/functions; the medallion 10, FIG. 1A is preferably permanently mounted on one of the right hand straps 43, FIG. 1A and-or left hand straps 44 by permanent fasteners, such as rivets (not shown) or in other positions such as 10, 210 on harness 200 FIG. 1J, per the maximum comfort of the animal, and/or veterinary assessment, in order to prevent removal thereof from the halter 40 or harness 200; medallion(s) may be positioned optionally per veterinary science, functions, and the lifetime well-being of the individual animal(s), breed(s) and species. Alternatively, the possible power sources for the medallions 10, 24, 210, as well as the GPS, lights, video, speakers and other functions described herein may be separated from the medallion itself (or the GPS, lights, etc.) and be provided as one or more independent element(s) connected to the medallions 10, 24, 210 (or the GPS, lights, etc.) to provide any required or supplemental power to facilitate the functions described herein. A central processing unit (CPU) can also be provided to monitor/regulate/and control power usage for the functions described herein. It is also within the scope of the present disclosure to permit artificial intelligence (AI) to monitor/regulate and control power usage and other capabilities, functions, purposes, services for the medallions 10, 24, 210 or other power requirements of the elements using varied power sources as disclosed herein.

FIG. 6: Away-from-animal communications, functions, recipients 12, 14, 16, 18 and 20; [28/triangle—schematic representation of safety halter/harness/hackamore/bridle device(s), functions, and/or sensor(s) halter/harness/hackamore/bridle optional per maximum animal comfort attachment locations];

- 12—all data/information communications by all modes to all devices and recipients.
- 14—to/from computer(s)/platform(s)/program(s), cloud computers, databases and/or smart portable and/or worn personal and/or animal borne/monitoring device(s);
- 16—stall/housing and-or shelter mounted/located devices, monitors and-or sensors, e.g., audio, (contagious coughing), visual/video imaging and/or behavior-pattern-monitoring, above, about and/or ambient to the animal;
- 18—real-time and/or database sourced communication(s)/transmission(s) to/from animal owners, animal devices, veterinarians, professionals and designate's computers and portable and/or sending/receiving/communicating borne and/or worn smart devices, per analytics, platform(s) and program(s);
- 20—satellite, GPS or other location technologies, monitoring, safe and unsafe GPS location(s)/zone(s) per electronic/other tech-boundary designations, and health, safety and activity analytics, alerts, notification zones, and/or other away-from-animal health, enjoyment, safety, photo, video, and/or sensor device(s), monitoring domestic and/or non-domesticated fur-bearing, game and/or nuisance animal(s) via balloons, drone(s), airplane(s) and/or aerial and/or other units, and/or non-domesticated fur-bearing, game animal(s) safety from poachers, and/or other monitoring.

FIG. 6 numbered elements: animal(s) body/health and safety halter/harness/hackamore/bridle device(s) and/or device(s)/monitor(s)/sensor(s)/sources sourced from painlessly-per-veterinarians-anesthesia inserted/ingested/implanted-in-animal-body, on-animal body, ambient-to-animal-body(ies) communications 22, 24, 26, 30;

22—against animal fur-hair-skin safety halter/harness/hackamore/bridle device(s)/monitor(s)/sensor(s)/sources (also FIGS. 2-4), communicating external-to-animal health and safety vital signs and processes sustaining/terminating information, to signal-booster-transmitter(s) 24 and-or directly to 12 and-or 14, 16, 18, 20 platform(s)/program(s) analytics/computers/device(s), human wearables, communicating sending/receiving/archive/smart devices;

24—singular and-or aggregating signal-booster-transmitter(s), communicating-monitoring-sensing vital processes and signs device(s) and-or sensor(s), functioning per 22 above;

26—away-from-animal-facing safety halter/harness/hackamore/bridle device(s), monitors and/or sensor(s) and/or sources (also FIGS. 2-5) functioning per 22 above;

28—triangle—schematic representation of on-animal safety halter/hackamore/bridle/harness device(s) and/or sensor(s) at optional-for-optimal halter/hackamore/bridle/harness equipment/trappings/tack attachment locations;

30—internal-to-animal-body device(s), monitor(s) and/or sensor(s) and/or sources surgically implanted painlessly per anesthesia, and/or inserted, and/or swallowed, functioning per 22 above;

32— dashes (--------) indicate lines of data/information communication(s) and/or transmission(s);

34— arrows indicate device, monitor and/or sensor functions.

FIG. 6—All devices/monitors/sensors 22, 26, 30, FIG. 6 communicate directly, and/or via signal-booster-transmitter 24, to/from remote-from-animal devices/wearables/computers/archives/smart portable devices/programs/platforms/persons/entities 12, 14, 16, 18, and/or 20.

Figure 7:
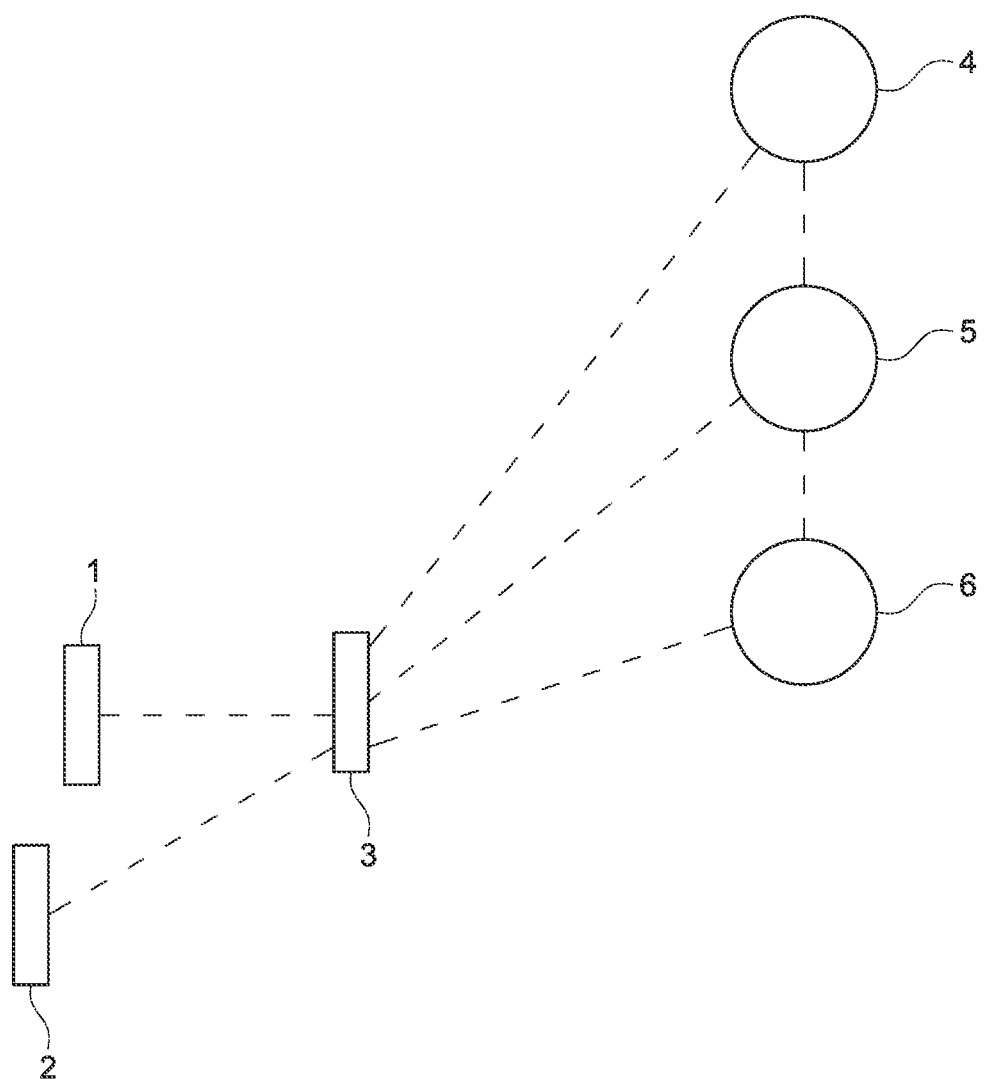
FIG. 7: is a schematic safety system illustration including components implantable devices/microchips or other monitors/sensors/sources 1, and on-animal devices/microchips or other monitors/sensors/sources 2, an optional communication(s)-signal-booster 3; a GPS or other location technologies unit 4; an archive(s) 5; and a network of smart devices (linked communications via computer(s), laptop(s), tablets, phone(s) and wearable(s)) 6, plus additional capabilities, functions, sources and services, disclosure following.

FIG. 7: U.S. Pet Parents Reciprocal Health And Databased ID Support Method—sourced capabilities and services, per Animal Safety System authorizations: Implanted 1, and/or out-of-animal body 2 borne animal/ownership/custody ID-identification microchip(s)/device(s) 81 and 82 (FIGS. 1D, 1F)—also monitoring internal animal life-impacting, sustaining and/or terminating vital conditions/signs—also monitoring internal and/or ambient and/or external to the animal body(ies) conditions per optional communication-signal-processor 3 FIG. 7, 113 FIG. 8; including GPS location; other technologies service(s), safe and unsafe zone(s) technologies/missing alerts-communications, and authorized animal search-location-recovery-custody-care-reunion-transport-remuneration per licensed professionals/persons/entities. (4) for databased recorded animal(s) and/or ownership(s) and/or designates identification(s)-communication(s), transmission(s), optionally including animal health history, information and instructions, via all devices/modes, for database included/recorded animal(s) and ownership(s)-designate(s) 5; specifically and generally for this disclosure, also including smart device(s) defined as communication(s)/transmission(s) by all modes and devices—computers, laptops, tablets, phones and wearables 6, multiple different capabilities and functions optionally combined into a single device/monitor/sensor, optionally using booster-communication(s)/transmission(s).

FIG. 7: Optional additional FIG. 7 capabilities, functions, services and technologies: a no-fee and/or for-fee database(s) animal care service(s), containing comprehensive animal and/or ownership-stewardship-designates information, optionally by an implantable and/or borne microchip 1, 2 per FIG. 7, and/or optionally other in-body and/or out-of-body animal borne identification means, identification specifically for each databased individual animal and its complete ownership identification information, including databased animal and/or optionally real-time communicated veterinary-health-history-safety information. Also optionally, bond may be posted and/or authorized by the ID Archive owning-sponsoring entity(s) and/or authorized by Animal Safety Databases System Principals, for lost/missing ID-archived animals authorized location-recovery-custody-care-reunion-undertakings. Optionally, services for ID-archived animals-ownerships may also include, yet are not limited to, optional GPS and/or other technology animal safe zones, locations and non-safe-lost/missing communications/publications/social media, optional Animal Safety Database System authorized professional/volunteer animal care-custody-recovery and ownership reunion undertakings, including, but not limited to providing a bond for compensating the informing-persons, reporting unlawful actions, and/or threats thereof, taken against the archived identities of, and information about ID-archived, animals-ownerships-designates included/recorded in the archive(s) and optionally the private and/or police investigation of such unlawful acts and/or threats, Other services for ID-archived animals may include optional lifetime animal care and/or endowment therefor, optional Animal Safety Database System sponsored animal ownerships-sourced pooled-dollar-resources for veterinary care cost-sharing for archive database-recorded animals/ownerships, and optionally pre-authorized professional animal-ownership care-custody-identification-location-transport-recovery-remuneration-reunion per Equine Health and Safety Database System authorization(s)—as enabled per disclosures and FIGS. 1A, 1B, 1C, 1D, 1E, 1F, 1G, 1H, 1J, 2, 3, 4, 5A, 5B, 6, land 8 capabilities, functions, services and optional technologies/platforms/programs/interfaced/integrated.

FIGS. 1 through 6, as disclosed, via halter/harness/hackamore/bridle-borne comprehensive health and safety services, protects financially and/or emotionally valuable equines-ungulates, canines and felines, and other animals.

ID Pet Parents Databased Animal Care and Enjoyment Support and Reciprocity—companion animal(s) enjoyment also involves much care-and-effort, thus companion animal owners'-stewards' duties-and-enjoyments sharing-and-reciprocity per no fee or fee. The Pet Parents' Database identifies, and per privacy protocols and screenings, confidentially accesses fellow animal-owner's-steward's and their companion animals, optionally via photos of companion animals/owners. The ID Database optionally includes zip codes, and contact, and optionally descriptive, information for owners/animals, and optionally includes volunteer availability interest in assisting-sharing-supporting other companion animal owners duties and enjoyments, e.g. walking the by-zip-code-neighbor's dog when said dog owner is recovering from knee surgery, or cat-sitting when the cat owner is away on business, or per screening, "Corgi Owner A" welcomes "Corgi B dog" into "A's home", and inversely has "Corgi B's Owner" likewise take care of "Corgi A dog" reciprocally into Corgi B's home, per any companion animal species/breed, etc.; such reciprocal companion animal owner-steward support-sharing greatly aids animals' well-being, being fully consistent with the animal-health and well-being-intent of these disclosures, e.g., as optionally companion-animal-members-of-the-family are reciprocally in companion-animal-friendly-residences, at home with other fellow-furry-family-members, plus human attention and care, or out walking, etc., rather than starkly-less-friendly harsh kennel-boarding cages. Joint neighborhood companion-animal-walking and enjoyment and reciprocity is heartily beneficial for owners and animals alike. Such owner-steward-socialization is evident in animal-friendly-parks, where owners happily socialize and companions robustly romp; Pet Parents comprehensive ID database, by providing information for mutual and reciprocal sharing of companion animal duties and enjoyments, builds strong socially-bonded friendship-dynamics, substantially benefitting both companion-parents and furry companions, both physically, (e.g., walking), and mentally (e.g., companionship); such ID Archive sponsorship of caring-connections, maximizing owners reciprocal and shared companion animal enjoyment, wellness activities, and support sharing, is yet another aspect of, and fully mission-consistent with, enhancing the lifetime well-being of canines and felines . . . likewise with Animal Safety System database recorded owners' equine care sharing, socialization and support too, per companion animal disclosures, including equines.

FIG. 7: Pet Parents Animal Safety ID Database—optionally provides all ID database registered animals and owners-designates with archived and real-time comprehensive identification, health, safety, missing-animal information, GPS/other technologies safe zone-unsafe zone communications, and aid/care/custody authorizations to archived animals/ownership via computer/telephony and/or personal operator(s), smart-device accessed and optionally operated-serviced-sponsored separately, in part, and/or wholly-from halter/harness/hackamore/bridle-borne comprehensive health and safety database(s), operations and services.

FIG. 7 is fully safety-mission-consistent with and complementary to the health and safety of highly valued animals, both financially valuable and-or life-long love-bonded emotionally valuable animal companions, and is a method for implanted/not implanted identification (hereinafter "ID") microchip identification, and/or other animal-borne comprehensive databased identification, in combination with GPS, or other location and/or tracking services and/or safe-zone/unsafe-zone location technologies, and optionally owner-designate noticing via all communication means, and licensed professional care-custody-transport authorizations, plus health vital signs monitoring, sensing and communicating, via all devices, and associated animal health and safety services, and their ID databased ownership(s), steward(s), designates(s), via smart-computerized-communicating-devices-wearables platform-program interfaced/integrated. The Animal-Safety ID System and Method is not halter/hackamore/bridle/harness dependent; thus, disclosure of the single and-or optionally multiple implantable and/or animal-borne microchips-devices-monitors-sensors, for identification-monitoring-reporting to owner(s)-designate(s), with at least three disclosure iterations, optionally all of the following separate, singular capabilities, functions and services disclosure iterations, as itemized within subparagraphs below, for database recorded animals-ownerships-designates.

1) Heart health-signs, and/or . . .
2) safe-unsafe GPS locations reporting, and/or . . .
3) other health and safety monitoring(s) of archived animal(s), communicated-reported to ownership(s)-stewardship(s), and-or designate(s), and/or . . .
4) smart communicating device(s), wearables alert(s) and/or notification(s) communicated to ownership(s), and/or entity(s), and/or veterinarians and/or animal professionals via comprehensive-text/images, and/or social media publications 5) medically-coded-archived-large and-or-small-animal-health-information, and/or
6) functions and monitoring(s) readable by a smart communicating device(s) wearable(s) for databased animal/ownership identification, and/or . . .
7) databased animal-veterinary records, and/or . . .
8) via chip-sourced direct connections and/or communications to a smart device(s) per 6 and 7 preceding, also 22, 26, 30, FIG. 6, via medallion and/or signal booster-24 to 12, 14, 16, 18, 20 via 32, FIGS. 6—1, 2, 3, 4, 5, and 6, FIG. 7 capabilities and function for real-time communicated veterinary history/information, and/or
9) missing animal notice communications/publications/news-social media, and/or . . .
10) Animal Safety ID System and ownership authorized media notices, general communications for lost/missing professional/volunteer animal/recovery, and/or . . .
11) Ownership(s), designate(s) lost-missing animal care/custody and recovery authorizations, and/or . . .
12) real time and/or databased GPS services location(s) information, and/or all communications via all devices/technologies, per smart communicating computerized devices-wearables, platforms-programs, and/or
13) smart communicating device(s)/wearables alert(s) and-or notification(s) to ownership(s), and/or entity(s), and/or veterinarian(s), and/or animal professional(s), and/or designate(s),—and/or . . .
14) monitoring of external-to-animal-body, and/or environmental, and/or . . .
15) internal-to-animal-body, and/or other vital life sign(s) impacting, and/or life sustaining, and/or life terminating variable(s), e.g., ambient in-automobile temperature, and/or internal breathing-pulmonary rate, and/or
16) functions and monitoring(s) readable by a smart computerized-communicating device(s)/wearable(s), and/or
17) painlessly per veterinarian-anesthesia animal body implanted, and/or
18) otherwise, animal-borne-worn microchip readable information,
19) communicated to a smart device(s), computer(s), tablet(s), laptop(s)-phone(s) and/or wearable(s), and/or . . .
20) via chip-sourced direct connection and-or communication to a smart device(s) per 6, 7 and 8 preceding, also 22, 26, 30, FIG. 6, and/or . . .
21) via medallion 10, 24-signal-processor 3, FIG. 7, 113, FIGS. 8, to 12, 14, 16, 18, 20 via 32, FIGS. 6—1, 2, 3, 4, 5 and 6, FIG. 7 capabilities and functions, and/or . . .
22) ID microchip, borne, or implanted painlessly via anesthesia and/or . . .
23) Medallion(s) 10, 24, 210-signal-processors(s), affixed to any animal-borne canine, equine-ungulate and/or feline control-safety-restraining device(s)-trapping(s)-tack, and/or . . .
24) databased information is accessed via smart devices, per paragraphs 6, 7 and 8 preceding, via access codes and/or other privacy protocols, with responses to ownership(s)-designate(s) authorized inquiries enabled via all communication/transmission modes, including, yet not limited to, computer, telephony and/or authorized personal operators and/or veterinary and/or other professionals and/or designates and/or entities, and-or . . .
25) ID-microchip(s)/indicia/database(s) facilitates-provides owner-steward and-or other designated authorized entity(s) contact information, and/or connection and/or care-custody-recovery-transport-reunion services per Safety System Principals) and/or ownership authorizations, pre-authorizations and information and/or communication connections)—all 26) via a smart device-microchip-reader and/or items 1 through 25 preceding, and other animal-owner-relevant information including, yet not limited to, archived recorded aid-care-custody-transport authorization(s) to, and/or by, animal-professional(s)-veterinarians-person(s)-entity(s) for Animal Safety System databased ownerships-designates, per FIGS. 1A, 1B, 1C, 1D, 1E, 1F, 1G, 1H, 1I, 1.1, 2, 3, 4, 5A and 5B, 6, 7 and 8 capabilities and functions.

Lifetime well-being of animals may continue past Pet Parent Stewards' lifetimes, as well as may prove expensive. Such Lifetime well-being may include A) posthumous pet care, B) pooled funds for pet care, C) bond against unlawful actions per system databased included animals/ownership, D) authorized custody-care-location-rescue-reunion-remuneration for Companions per Ownership'-Designates' Companions in unhealthy-unsafe situations, comprehensively identified in the System Database, and E) Comprehensive Databased equine, feline and/or canine Companion Care, Socialization, Support and Reciprocity.

Discussion: Vital signs monitoring is of internal and/or ambient-environmental animal-life-impacting, sustaining and-or terminating condition(s), e.g., surrounding temperature and-or hurricanes, and/or heart rate, and/or cardiology-cardiograph. Health and safety information communications and/or notices/alerts originate from the singular implanted microchip(s)-device(s), and/or not implanted animal borne/worn devices/medallions/indicia, communicated to ownership(s)-designate(s) and-or archives-databases-monitors-platforms-programs, either directly and/or via an animal worn signal-processor 113, FIG. 8, from monitors/sensors 22, 24, 26, FIGS. 6, and 1, 2, 3, 4, 5, 6, FIG. 7, to designated sending/receiving communicating smart devices-computers-laptops-tablets-phones and/or wearable devices, and/or analytic platforms and programs/interfaced and/or integrated, remote from the animal(s) and-or animal-ownership(s). The Animal-Ownership-ID-Archive and medallion(s) function as a sending-receiving-communicating nexus for persons/entities involved in animal-ownership-designate-relevant health and safety occurrences, and other events, optionally including history, information, instructions, and records.

FIGS. 1 through 7, as disclosed, via halter-hackamore-bridle- and harness-borne comprehensive health and safety functions and services, protects financially and/or emotionally valuable equines-ungulates-canines and felines.

Also, per Pet Parents' Safety System Database, the recorded ownerships and/or their animals bear databased-archived-recorded-identification-indicia, via implant and/or animal borne restraint and control devices/trappings/tack, regardless of halter/bridle/hackamore/harness usage.

Figure reference numerals guide in drawings:
FIG. 1A:10, 40, 41, 42, 43, 44, 45, 46;
FIG. 1B: 10, 24, 40, 41, 42, 45, 46, 50, 51, 52, 53, 58, 160;
FIG. 1C: 70, 71;
FIG. 1D: 70, 71, 81;
FIG. 1E: 60, 62;
FIG. 1F: 61, 63;
FIG. 1G: 64, 65;
FIG. 1H: 10, 41, 42, 44, 47, 50;
FIG. 1I; 10, 41, 42, 44, 80;
FIG. 1J: 10, 40, 41, 42, 43, 46, 58, 200, 210;
FIGS. 2: 1, 2, 3, 4, 5 and 6;
FIG. 3: 2, 5, 6 and 7;
FIGS. 4: 2, 6, 8 and 9;
FIG. 5A and FIG. 5B:10;
FIGS. 6: 12, 14, 16, 18, 20, 22, 24, 26, 28, 30, 32, and 34 illustrate, disclose and enable halter/hackamore and bridle and harness smart communicating computer(s)-tablet(s)-laptop(s)-smart phone(s)-wearable(s) archived/database information, authorizations and real-time comprehensive animal health and safety capabilities and functions between animals-animal owners-stewards-designates-persons-entities for animal comfort, enjoyment, health, safety and well-being, plus ambient conditions, and safe-unsafe-missing animal GPS and otherwise-designated location(s).

Discussion of communications systems: As shown in FIG. 6, external sensors 1 and 3, FIG. 2 and other animal-relevant information from sensor 4, FIG. 2 can be transmitted (wirelessly or hard wired) to the communication devices(s), and the data obtained from the animal's vital life process and signs can then be communicated (remote of the animal) via all communication devices/modes 12, 14, 16, 18, 20, 22, 24, 26, 30, FIG. 6, optionally directly to analytical/monitoring/sensing devices/platform(s)/program(s) interfaced and/or integrated, cloud computing devices and/or smart computing devices, and/or optionally to on-animal-worn-in-situ-device(s) optional treatment(s)/administration(s), FIG. 6, via a halter-hackamore-bridle and/or harness borne devices per instruction(s), with information via signal-booster-transmitter(s) medallion(s) 24 (FIG. 6), optionally aggregating internal-animal-body sensor(s) 30 transmission(s), on-animal-body-external-sensor(s) transmission(s) 4, FIG. 2, and away/distant-from-animal information 1, FIG. 2, (such as, but not limited to, external temperature and/or weather), and/or satellite, drone, airplane, or other device(s)/monitor(s)/sensor(s) and/or communication(s)/transmission(s)/antenna/equipment/transponder(s)/transceiver(s)/frequencies (e.g., microwaves)/modes, including radio frequency identification ("RFID"), IOTA, (an open sourced distributed ledger and cryptocurrency designed for the Internet of Things ("IoT") having a higher scalability than blockchain based distributed ledgers and supporting both value and data transfers), MIOTA ("MegaIOTA")/ID, blockchain/including other database technologies—also including between-straps device(s) 3, FIG. 2. Aggregated animal and/or owner(s) or associate(s) relevant information is optionally further signal processed before being-transmitted, via all communication(s)/transmission(s) devices FIG. 2. Aggregated animal(s) and/or owner(s) and/or associate(s)/designate(s) relevant information, is optionally further signal processed before being transmitted via all communication devices FIG. 6 to smart human communicating/computing electronic devices and/or persons/entities—such as, but not limited to, computer(s), smart communication devices, and wearable smart devices—together as 12, 14, 16, 18, 20 and medallion 24, FIG. 6; (also medallion 10 on halter 40, FIGS. 1A, 1.1; medallion 10 on bridle 50, FIG. 1H; and/or medallion 10 on hackamore 80, FIG. 1I, medallions 10 and 210 on harness 200, FIG. 1J) communications and transmissions capabilities, as now-available and developing/perfecting bio-chem and/or other electro/micro/nano-miniaturizations allow dual and/or multiple halter-bridle-harness-hackamore databased and-or real time communicating nexus medallions 10, 24, 210 and/or likewise innovated capabilities-devices-mechanisms-platforms-programs. The animal(s) schematic strap-drawings illustrate strap-halter-hackamore-bridle-harness-attachments 1 away-from-animal, and against-animal 4, FIG. 2, and/or optionally between-straps enclosed units 3; the Comprehensive Halter-Harness-Hackamore-Bridle Health and Safety System also includes legacy veterinarian device(s), monitoring(s), practice(s), procedure(s), treatment(s) and sensor(s), in dynamic union with currently available and innovated micro/nano-bio-chem-tech and other device(s), monitor(s) and sensor(s). External animal monitor(s) sensor(s) and/or device(s) FIGS. 2 1, 3 and 4 are operationally configured optimally and optionally, as all FIGS. disclosed, per the maximum comfort and well-being of the animal(s), and-or breed(s), and/or species, as are internal-animal-body-sensor(s) and/or devices FIG. 6/30; Internal- and external-to-animal-body devices, monitors and-or sensors are also operationally, optionally and optimally configured to maximize the overall maximum comfort and lifetime well-being of animal(s), breed(s) and species, according to veterinary science, and technical expertise, instructions and animal comfort protocols.

Information is optionally transmitted to, and monitored by, veterinarians, animal owners-stewards, designated associates, care/custody/identification/location/recovery/transport authorized custodians, professionals and/or programs/persons, including research institutions. It is contemplated that veterinarians, or other qualified professionals, optionally may custom-fit the strapped halter-bridle-harness-hackamore borne sensing, monitoring and communicating halters-bridles-harnesses, and other similar halter/hackamore/bridle/harness animal control and restraint device(s) per FIGS. 1A, 1B, 1C, 1D, 1E, 1F, 1G, 1H, 1I and 1J as herein repeatedly emphasized; the functional components of the Pet Parents enjoyment, health, safety and support systems are operationally and optimally configured optionally per the maximum comfort and well-being of the companion animal(s), breed(s), and species, and generally comfortably configured likewise via manufacturing protocols, and/or specifically comfortably configured via bespoke fittings. The functional components of the enjoyment, health safety and support systems devices, monitors, and/or sensors communicate vital information, data, markers, processes, and signs to smart devices, platforms and/or programs, for communication, enjoyment, location, logging, health and safety purposes, plus reporting, database storage and general animal-relevant comfort and well-being maximization, and owner-steward and-or designate-relevant usage.

The halters, and similar halter-like hackamores, bridle-and-harness health and safety monitoring animal control and restraint devices/trappings/tack, as disclosed are relevant to the health and safety of personally valuable, family-member animal companions, and/or economically valuable trophy animals, e.g., Arabian, breeding, polo, quarter horse and thoroughbred racing and other equines.

However, having primarily directed the foregoing disclosure to trophy equines used in the sports of racing, polo, and/or the breeding of equines, this disclosure is not to be unduly limited by reference to the foregoing extensive disclosure to such animals. It will readily be appreciated by those having ordinary skill in the art, upon reading the foregoing disclosure, that the teachings contained herein can be readily extended to include other animals and/or breeds and/or species without the exercise of invention and that it is not the intent to be limited to application only to equine halters/harnesses/hackamores and bridles, but also has generally applicability to other types of human companion species, such as felines and/or canines and their harnesses, without undue experimentation by the ordinary worker skilled in the art.

Canines have also acquired multiple roles as socially valuable animals to their owners and breeders, irrespective if they are trained as—show dogs, guard dogs, war/military dogs, emotional support dogs, police dogs, service dogs, rescue dogs, sled dogs, "seeing-eye" dogs, comfort dogs, and-or lifelong-loved companion animals to their wellness overseeing owners-stewards, as "Furry Family Members" of their households; felines also qualify as lifetime-loved emotional comfort, enjoyment, and support companion animals, also as "Full Furry Members of the Family Household."

It is readily within the scope of the appended claims that harnesses (as distinguished from a collar fitting only about the neck of the animal), for these companion animals, e.g., canine and feline, is also within the scope of the invention. The fundamental strap and design FIGS. 1C, 1D, 1E, 1F and 1G, and functions of an animal harness for companion animal control and restraint, is comfortably similar to a halter/harness/hackamore/bridle as used with equines. Harness: The around-the-neck strap(s) FIGS. 1C and 1D, for companion animal canines (shown), and felines (not shown), is also around-the-neck behind-the-ears, as with the equine halter headpiece 42, FIG. 1A; however, with the harness, the behind-the-front-legs/under-the-chest-harness-strap—connects to the animals around-the-neck-harness-strap, connecting to the neck strap on each side of the chest, either connecting directly (not shown)—or per FIG. 1D-(shown) connecting via the short-between-the-shoulders strap, that connects collar-to-around-the-chest strap; the between-the-front-legs-harness-strap FIG. 1C—connects the around-the-neck-harness-strap—to the under-the-chest-harness-strap including non-strapped harnesses/one piece harnesses, FIG. 1F, strapped tactical-military harness, FIG. 1G, and body-covering harness FIG. 1E. Body-covering harnesses optionally provide animal body warming capabilities, as disclosed below. Examples of such harnesses are used in the environment of sulky-seated drivers, in the environment of the so-called "harness racing," typically between pacers and trotters, in the professional racing environment, in training therefor, and, in general outdoor recreation, when used as an alternative to riding an equine by mounting it. Another example of a body covering for an equine is commonly known as a "horse-blanket," Such body covering harnesses and/or blankets may not only be provided with the various devices/monitors/sensors/sources (DMSS) described above but may also include heating elements to warm the body of the equine.

Per FIGS. 1C, 1D, 1E, 1F and 1G—generally similar companion animal harness components come in a variety of adaptations. FIGS. 1C, 1D, 1E is an image are illustrations of a canine service dogs 60 (71 also) with a vest harness 62, (63 also) (similar to the equine harness 200, FIG. 1J), FIG. 1F is an image of another canine 61, with a one-piece harness 63; and FIG. 1G displays images of the military/tactical harness 64 on yet another breed of canine 65; FIG. 1G-type harnesses may cover much, most, or in some cases all of the animal body. Vest harnesses cover much of the animal's chest and in some cases, cover some (e.g., most, or all) of the animal's back and body; one-piece harnesses are often made of soft, flexible, rugged, material, optionally with a buckle-strap(s) for a snug fit. Military-type tactical canine harnesses have one neck and one chest strap, vest body coverage, and optionally a second anterior stomach strap: tactical-military/vest FIG. 1G/body covering FIG. 1E/one-piece FIG. 1F harnesses provide the combined-integrated design disclosure premises for "companion animal warming harnesses," that cover much of/all of the animal body, and per Energy/Power Sources (disclosed herein), provide animal-borne-worn heat-retaining materials and/or animal body warming-heating elements-devices fully integrated with body covering harness materials; equine body-warming-heating trappings provide the design premise for disclosing (also energy/power sourced per below) "companion animal warming harness" disclosures are fully inclusive of, and readily and fully extended to include equine body-warming-heating trappings disclosures.

Companion animal harnesses optionally have handles, in addition to front, back, mid and/or multiple clips, for lead/leash attachment . . . the leash optionally alarming/signaling personal smart devices when the leash is disconnected by unauthorized persons . . . animal-kidnappers beware!

Thus, configurations of a companion animal harness-strap-fits across-the-chest, behind the front-legs shoulders; and, the "across-the-chest-strap" may connect via a between-the-front-legs-strap, connecting with an around-the-neck strap, and/or an across-the-shoulders-strap connected by the-between-front-legs-strap to the chest-strap, as shown for example, in FIG. 1G. Harness configurations shown in FIG. 1G and/or 1E, indeed 1F too, may also be incrementally configured to cover much of, and/or most of, and/or all of, the whole animal's body for body warming/heating, and/or other purposes, with per-design adaptations-portals for animal bodily eliminations.

Harnesses, as halters/hackamores/bridles, maximize animal comfort; whereas collars often uncomfortably choke energetic companion animals, and may cause trachea damage and crushing—while some collars are designed to painfully restrain-via-choking; the comfortable design and careful-flexible fit of the harness does not choke nor hurt an animal, rather comforts the animal, as the animal's forward energy is gently distributed about the chest and shoulders, plus balanced via the front legs; thus sled-dogs wear harnesses, fundamentally similar to FIG. 1J, as collars would choke, restricting their harness sled-pulling movement.

Nor is the invention limited to halters/harnesses/hackamores/bridles for equines, as the halter/harness/hackamore/bridle may also be applicable to other animals, such as ungulates, other than equines, as well. Other beasts of burden, such as reindeer, are also economically valuable animals for which this invention is directly applicable.

It should be understood by those skilled in the art that the various DMSS described in use with equines of FIGS. 1A, 1B and 1H, can also be included in any of the various harnesses shown in FIGS. 1C, 1D, 1E, 1F and 1G in analogous fashion.

Energy Power Sources: It is to be understood that device(s) and/or sensor(s) power sources are optionally exterior-to-animal-body batteries; and/or battery powered painlessly-per-anesthesia-surgically implanted and/or swallowed/inserted units; and/or wireless and/or wired electrically charged and/or re-charged external and/or internal-to-animal-body units; and/or motion-generating energy units, e.g., pendulum-generator, etc. units; and/or strap/tack/trappings borne solar-sourced units (not shown); and/or internally self-powered internal-and-or-external-to-animal-body devices, monitors and sensors; external power sources, configured per units 1, 3 and 4, FIG. 2 are optionally affixed on, or enclosed by animal-worn halter-hackamore-bridle-harness-type straps/materials; internal animal body power sources/monitors/devices are painlessly-through-anesthesia-surgically installed and/or inserted/swallowed within the animal per FIG. 6, element 30, also 22, 24, 26.

When batteries are the source of power to the devices/monitor(s)/sensor(s)/source(s) (DMSS), plus self-powered units, communicating-transmitting devices, etc. as disclosed herein, it is preferred to utilize high power-to-weight batteries, or other energy sources. Especially useful are rechargeable secondary batteries, such as lithium-ion batteries. The batteries may be mounted in the devices themselves, such as within the device/monitor/sensor, GPS or other technologies, medallion, transmitting device, etc., or may be wirelessly or wired thereto, as disclosed above, in order to supply the power for the intended function of the sensor(s)/monitor(s), etc. The various battery(ies) may be recharged while on/in or borne by the animal, or remote from the animal. Any suitable recharging apparatus can be used as the power for recharging the rechargeable battery(ies) such as provided by electric energy from the electric grid, solar, wind, or other power source, including self-generating and/or internal power sources, including power generated by movement of the animal. Implants, and on-body borne units, include units that self-generate power sources. Of particular interest is the use of solar power, where the solar power cells are mounted upon the harness/hackamore/bridle/tack, or otherwise animal borne, to maintain the charge of the batteries during sun-daylight conditions, and/or the solar cell source is mounted on the animal's housing or otherwise mounted/sourced. The external sensor 1, in FIGS. 2-3 may also be multiple function devices, including batteries or solar cell powered. Of course, it is within the scope of this disclosure to separate (or combine) multi-function elements into single-function elements and vice-versa. FIG. 2 illustrates unit locations with HHHB-devices having multiple unit location options.

In Summary—internal animal devices, monitors, sensors, sources (DMSS) within the animal(s) body, optionally are painlessly per veterinarian-anesthesia surgically implanted, and/or inserted, and/or swallowed; and internal and/or external body devices/monitors/sensors/sources communicate directly with external computers and/or multiple smart devices/entities/persons as disclosed, optionally personal wearables, and-or via a borne-by-animal-halter-hackamore-bridle-harness communications signal booster per FIG. 6/12, 14, 16, 18, 20, 22, medallion-24, 26, and 30, 210 FIG. 1J (also optionally FIGS. 1A, 1B, 1H, 1I and 1J medallion-10; thus, it is also to be understood that functional system devices, monitors, and sensing/sourcing components: are optionally within the animal(s) body, e.g. internal devices/sensors; on the animal(s) body, e.g. external body devices/sensors; and/or distant from the animal(s) body, optionally e.g. GPS and/or satellite and/or other technologies, and/or drone, and/or airplane, and/or stall and/or shelter mounted monitoring devices and/or sensors above and/or around and/or about the animal(s) for audio monitoring e.g. contagious-coughing, and/or visual-video imaging of behavior(s), and/or other enjoyment, health and safety animal device(s) and/or animal sensor(s) monitoring. Monitored animal(s) enjoyment, health and safety communications and information is logged, analyzed, archived, diagnosed, and/or researched, via programs and platforms, interfaced and/or integrated per privacy protocols, for commercial uses, and/or animal-human-disease control and non-profit activities and research, that includes veterinary, medical and public health benefits, and purposes.

Devices and/or sensors and/or platforms/programs as disclosed herein are designed to serve and advise, alert, analyze, archive, communicate, diagnose, evaluate, film, log, monitor, photograph, record, research, store, video, transmit and/or otherwise communicate and/or process via platforms and programs animal(s) comfort, enjoyment, health, safety and lifelong well-being information for diagnostics, procedures, treatments, science, research and/or via veterinarian, medical and public health institutions; such serves animal health and human health via disease contagion, knowledge, and prevention, also serving principal animal owners and/or allied veterinary and other professionals and designated associates, for commercial and/or non-profit use.

The present disclosure is suitable for one, more than one, or a plurality of simultaneous monitoring and sensing capabilities and/or devices for the following animal bodily processes and systems, practices and procedures, while not limited to the following supplemental examples, e.g.: 1) microfluidics . . . 2) photo-video image detection techniques . . . 3) sound analytics (coughing-contagion) . . . 4) sweat and salivary sensing . . . 5) wearable technologies . . . 6) nano-biosensors . . . 7) serodiagnosis . . . 8) infectious disease detection . . . 9) communicating devices, monitors and sensors/sources . . . 10) molecular biology diagnostics . . . 11) biochem sensors . . . 12) internal body temperature and/or ambient temperature measurement, logging and notification . . . 13) metabolites monitoring . . . 14) breath-breathing analysis/monitoring . . . 15) implanted, ingested & inserted devices, monitors and sensors . . . 16) medication patches 17) tracking/location programs . . . 18) behavior and movement monitoring . . . 19) pH detection . . . 20) stress detection . . . 21) sound analytics . . . 22) analytes detection . . . 23) virus-pathogen detection . . . 24) contagion detection & prevention—culling diseased animals . . . 25) solar powered health monitors transmitting data to computer-archives . . . 26) ear attached bio-sensing devices measuring body temperature/other signs . . . 27) iontophoretic drug delivery . . . 28) patched and under-skin devices, treatments . . . 29) antibiotic biosensor detection of sub-therapeutic usage causing antibiotic resistance preventing enteric and respiratory disease treatments . . . 30) Maximum Residue Limits biosensors for pharmacologically active antibiotic substances and metabolites . . . 31) integrated data measurements and data acquisition systems via biosensors and monitors producing real-time-rapid health and treatment solutions, and rapid responses to animal-human contagion, including in situ . . . 32) rapid detection of the presence or absence of biomarkers and specific chemicals of life-death importance, e.g. the monitoring of glucose or protein or enzymes or sepsis in the bloodstream . . . 33) bio-nanotechnology and microelectronics make possible the fabrication of transistors smaller than 100 nm & integrating several hundred 100 nm transistors into functional program-platform analytic circuitry via micro-chips . . . 34) microfluidics technology for the rapid detection of analytes . . . 35) thermoplastic and paper based chips have revolutionized disease diagnostic platforms and programs . . . 36) integration of microfluidics and florescent label ensures minimum sample volume and enhancement of sensitivity . . . 37) microfluidics—allows spatial and temporal resolution plus differentiation between non-hybridizing and hybridizing oligomers of DNA . . . 38) surface plasmon resonance-multiple SFR platforms now operational . . . 39) portable SPR device detects antibiotics . . . 40) very accurate screening achieved via digital microfluidics and SPR . . . 41) non-invasive sweat analytics—monitors sodium, potassium, lactate, glucose and skin temperature—blue tooth integrated plus other technologies, communications and analytics . . . 42) diagnosis of diabetic ketoacidosis 43) radio-frequency identification tracking of health related behaviors . . . 44) total quality health management principles substantially benefit animal well-being . . . 45) sweat analytics—pH, CL, Na, glucose, ethanol, lactate, ammonium, electrolytes—sodium, potassium ions, zinc, ions—(Na+, CL-, K=, NH4+), cortisol, urea, peptides—neuropeptides & cytokines, calcium . . . 46) pathogen detection—biosensor-based imaging ellipsometry . . . 47) wasting disease detection requires 24 hour audio-video monitoring—cough-sound detected via audio analysis and motion detection . . . 48) temperature—body core & major organs temperature monitored by rectal, vaginal, vascular and digestive-tract monitors and sensors . . . 49) mid-peripheral temperature-monitored by intra-muscular chips . . . 50) peripheral-skin temperature—monitored by skin-embedded micro-chips and through fur-hair skin-contacting multiple sensor probes . . . 51) saliva analytics—as breath and sweat-non-invasive . . . 52) electro-chemical and bio-metric devices, monitors and sensors communicate analytic health data to computer programs and/or platforms integrated and/or interfaced . . . 53) animal-to-human contagion—real-time device, monitor and sensor detection of zoonotic diseases speeds public health contagion and veterinary-medical treatment protocols.

Administration(s) of chemical(s), especially pharmaceuticals, in response to a sensor(s)'/monitor(s)'readings from the animal is also within the scope of this disclosure. The sensor(s)/monitor(s) of the Equine Health and Safety System as herein disclosed can take the readings of the animal's blood sugar, for use in evaluating this condition, which is then addressed by administering insulin. With reference to FIG. 1B, a medicament/pharmaceutical dispensing device 160 may be attached directly to an equine's skin, by locally shaving the hair from the animal (equine, canine, feline, or other animal as defined herein), and attaching the dispensing device 160 directly to the shaved portion of the skin of the animal. The medicament/pharmaceutical dispensing device 160, may dispense topical, transdermal, subcutaneous, or intramuscular medicament/pharmaceuticals, such as hormone(s), tranquilizer(s), insulin, or other pharma treatment substances, in response to a data communication from medallion(s) 10, 24, 210.

As an example, readings indicating that the animal has an abnormal high blood sugar (diabetes) can be used to actuate an insulin device (such as 160, FIG. 1B) attached to the animal. The actuation can either take the route of sensing/monitoring the animal's blood glucose content, transmitting the readings to a location remote from the animal (e.g., to a designated veterinarian/owner/steward or other designate), who then makes a decision as to whether, and how much, insulin is to be administered to the animal and a communication to the insulin source is actuated to administer the prescribed dose of insulin. As an alternative, where the animal suffers from persistent high blood glucose, the readings from the sensor(s)/monitor(s) of the Health and Safety harness/halters/hackamores/bridle, or other gear, trappings and tack, can be used directly to actuate the administration of insulin to the animal on a one-dose basis; or on a periodic basis, while continuously or intermittently sensing/monitoring the animal's blood sugar. Of course, in both cases, the Health and Safety System can be used to transmit the act of administration to a database/owner(s)/veterinarian(s)/stewards or other designate(s), which is logged and archived into the database to provide a real-time record of the animal's health; such administrations can and may be undertaken for any, and all, medical/veterinary conditions and/or treatments.

Similarly, the animal's vital life signs, such as cardiac rhythm, cardiograph, cardiology can be sensed/monitored using the Health and Safety System disclosed herein to monitor animal vital life signs, transmit the vital life signs to a location remote from the animal, such as to the designated steward(s)/veterinarian(s), owners(s) or other designates, archive, or for the determination if life-preserving drugs need to be administered in real-time, even though the animal may be disoriented/missing, or in an unsafe location remote from the actual location of the designated steward(s)/veterinarian(s), owners(s) or other designates. Once a determination of the type and dosage of a pharmaceutical to be administered is made, it can be administered directly to the animal by human intervention, i.e., by a local veterinarian; or it can be administered from a local source of the pharmaceutical attached to the body of the animal. Also, similar to the administration of insulin in the previous example, the administration of a cardiac drug can be affected directly on the animal, in response to the sensed/monitored readings, without human intervention, and/or direct-indirect human intervention.

Figure 8:
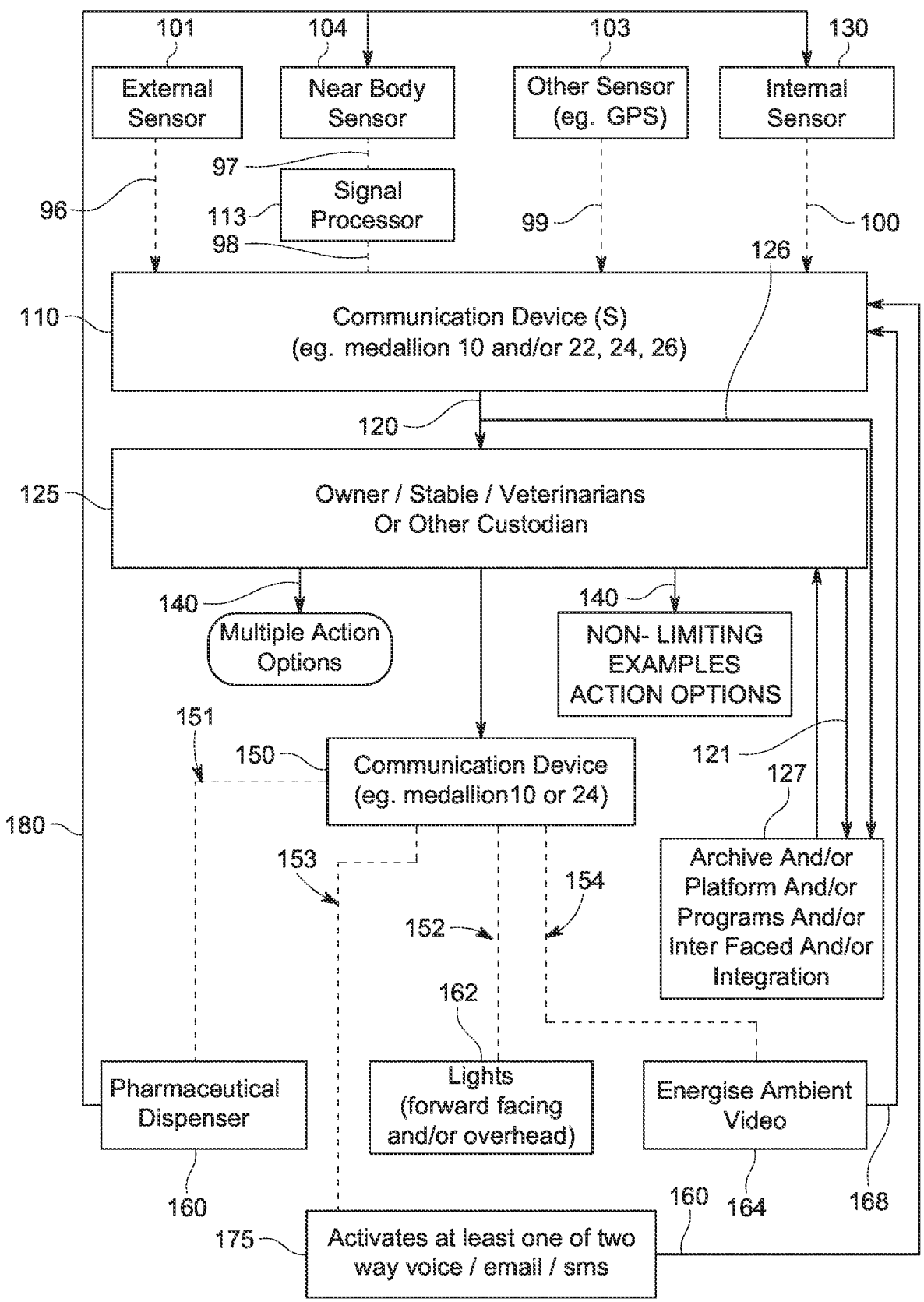
FIG. 8 is illustrative of a flow diagram for implementing the disclosure of the Animal Health and Safety System disclosed herein.

FIG. 8 is illustrative of a flow diagram as a method/process for implementing the disclosure of the Animal Health and Safety System disclosed herein. In the method of FIG. 8, the process begins when at least one of external device/monitor/sensor/source 101, near body device/monitor/sensor/source 104, other sensor 103 (which could be a GPS or other type of technology, sensor) or internal/implanted device monitor/sensor/source 130 that generates data. Data can be signal processed before being communicated to communication device 110. For ease of illustration, only one signal processor 113 is shown. However, it is to be understood that more than, or less than, one signal processing can be performed before the data from external device/monitor/sensor/source 101 is communicated to communication device 110, and all, or only some, of the data from near body device/monitor/sensor/source 104 is communicated, via communication link 98; other sensor 103 communicated via communication link 99 and/or internal sensor 130 is communicated via communication link 100. As disclosed herein, communication links 96, 97, 98, 99 and/or 100 can be of any type, such as wireless or wired (including optical, or other technology) links. Communication device 110 (which may be medallion(s) 10, 24, 210 or a separate device, will accept the raw and/or signal processed data and communicate the data to a site remote from the animal via link 120. This remote site could be an owner, a stable or other authorized custodian. It could also be linked directly to an archive 127, and/or interfaced and/or integrated per platform(s) and/or program(s) via communication link 126. The recipient 125 of the communicated data may act, per link 121, on the data, and/or archive the data for later study via communications per link 121. If the recipient 125 of the communicated data wishes to act, the action can be in any of multiple action options 140. For example, aided by the GPS, or other technologies, of other device/monitor/sensor'source 103, the owner' veterinarian or other authorized custodian could be guided to the location of the animal. Alternatively, the action of recipient 125 could take the form of a further communication via communication link 140 to the communication device 150, which could be, but is not necessarily required to be the medallion 10, 24, 210. Such action of recipient 125 could be to enable a pharmaceutical dispenser 160 on the animal to dispense medicament to the animal, or other intervention-procedure-treatment. In such a case, new data, in response to the dispensing, may occur via communication link 180, which new data will then be generated by at least one of near body devices/monitor/sensors/source 104 or internal device/monitor/sensor source 130. Alternatively, or simultaneous with energization of the pharmaceutical dispenser 160, other functions of the animal health and safety system could be enabled, such as lights 162, video 164 and/or activation of two-way voice/email/SMS/other technologies 170 via communication links 152, 154 and 153, respectively, or other communication systems.

The understanding of the present disclosure may be better understood by the following Examples. Action Options 140: per raw data link 120, or per platform-program processed data 127, link 121 and/or archive data 127, link 121, multiple actions 140 are undertaken; Examples follow:

EXAMPLES

Example 1

An animal, such as an equine, may be away from its stable, when a signal is generated by external DMSS 101. That signal could be detection of hazardous environmental conditions, such as wind-borne traces of harmful agricultural chemicals, e.g., pesticide. The signal from DMSS 101 (FIG. 8) is transmitted to communication device 110. The communication device 110 (for example, medallion 10 and/or 24) will transmit a signal 120 to a location remote from the animal, such as to an owner/stable/veterinarian or other principal designate 125. The signal 120 may also be automatically directed, via 126, directly to an archive 127, or may be manually directed to archive 127, via 121, by the owner/stable/veterinarian 125. If the exposure of the equine to the harmful agricultural chemical requires immediate action, the owner/stable/veterinarian or other designate can retrieve the animal, optionally with the aid of GPS, or other animal locating technologies. Also, 127, via 121 feedbacks, per archive and/or platform(s) and/or program(s) to 125 can and may cause owner/principal designate to undertake 140 remedial actions; 150, 151, 152, 153, 160, 162,164, 168, 175 are action option(s) examples-action options are not limited to the Examples.

Example 2

Similar, to the scenario of Example 1, the DMSS 101 receives a source, such as a NOAA, county, or other governmental advisory of hazardous weather conditions, e.g., high winds, tornado, etc. The signal from DMSS 101 (FIG. 8) is transmitted to communication device 110. The communication device 110 (for example, medallion 10, 24 and/or 210) will transmit a signal 120 to a location remote from the animal, such as to an owner/stable/veterinarian or other designate 125. The signal 120 may also be automatically directed, via 126, directly to an archive/platform(s)/program(s) 127 or may be manually program/platform directed to archive 127, via 121, by the owner/stable/veterinarian/ or other designate 125 per program and/or platform. If the exposure of the equine to the hazardous weather conditions requires immediate action, the owner/stable/veterinarian or other designate can retrieve the animal, optionally with the aid of GPS, or other animal locating technologies. Please note—FIG. 8, 140, Multiple Action Options: Actions can and may be undertaken to protect the health, safety and general well-being of individual Furry Family Members, beloved polo steeds, and pampered thoroughbreds with syndicated ownerships. Yet device(s)/monitor(s), sensor(s)/sources(s) ("DMSS") information impacting the health and safety of animals can and may also impact animals in multiple U.S. Zip Codes, counties, states, whole regions, with DMSS information impacting Database-Included Animal(s)-Ownership(s)-Designate(s)-Principal-Steward(s). Please consider . . . thoroughbred horses with multiple-global ownerships, plus the likes of SPCA rescue kennels nationally, and the impacts of recent NOAA sourced tornado warnings, with following destruction and death, as it impacted-impacts thoroughbred farms principal steward's horses, plus rescue canine and feline facilities nationwide; tornadoes (and all manner of extreme environmental conditions, summer heat waves to winter artic air moving south) regularly cause widespread death and suffering, plus extreme emotional and financial losses, across the equine-feline-canine U.S. realm. Thus, the importance of FIG. 8, 140, per DMSS Multiple Animal Health and Safety Action Options, as environmentally (and generally) defined . . . urgent per zip code-county-state-region DMSS advisories, via all communication devices and methods, to Health and Safety System Database-Included Animals-Owners-Designates-Principal Stewards, causes DMSS powered actions, so animals are not being killed by the likes of seasonal heat and seasonal tornadoes. DMSS Health and Safety System Generated Information . . . from sepsis sensed in the individual beloved Furry Family Member, to tornadoes forecast across a vast five-state-region impacting thousands of animals;

DMSS Health and Safety System Generated Information powers and sustains animal well-being.

Example 3

As in Example 1, an animal, such as an equine, may be away from its stable, when a signal is generated by near the DMSS 104. DMSS 104 can detect multiple life-threatening or life-sustaining signs or conditions of the animal. In this example, DMSS detects high blood sugar signs or conditions in the equine. Again, this animal sign or condition will be transmitted, via link 97 to communication device 110. Alternatively, if the signal generated by DMSS 104 needs to be modified, it can be first submitted to signal processing 113 and the signal processed DMSS signal is the communicated to the communication device 110 via link 98. Once the communication device receives a signal (via either link 97 or 98) the communication devices communicate, via link 120, to the owner/stable/veterinarian or other designate 125. If the owner/stable/veterinarian or other designate 125 determines that the high blood sugar requires immediate medical intervention, a communication is sent to the communication device 150, via link 140, to administer insulin. Communication device 150, via link 151, instructs the pharmaceutical dispenser 160 to administer a dose of insulin directly to the animal. Links 120-126-121 per archive(s) and/or program(s) and/or platform(s) interfaced and/or integrated 127, may also per feedback link 121, redirect to 125 per multiple action options 140.

Example 4

In connection with the canine 71, fitted with a harness-strap design of FIG. 1D, the other sensor 103, FIG. 8 determines that the canine is in a no-safe zone, e.g., it has left its yard enclosure and cannot be found therein or nearby. When acting as a GPS, or other technology location, sensor 103 sends a signal, via link 99, to communication device 110, which in turn is communicated remote from the animal, via link 120, to the owner/veterinarian or other designate 125. The owner/veterinarian or other designate can then send a communication, via link 140, to the communication device, which in turn, can activate one, or more, of lights 162, energize ambient video 164, open two-way voice 175, and determine the severity of danger in the no-safe zone. Feedback can be provided, via the links 168 and/or 169, providing additional information through communication device 110 to the owner/veterinarian or other designate to further determine the danger to the canine. Appropriate action can then be taken by the owner/veterinarian or other designate, including the administration of a medicament, eg, a sedative, via the pharmaceutical dispenser 81 of FIG. 1D. Feedback link 121 also can and may per 127 redirect DMSS to 125 for other 140 action options.

Example 5

With regard to canines, especially when the canine is in freezing or sub-freezing weather, DMSS 104 can sense animal temperature (e.g., one of core temperature, skin temperature, or both), before onset of life-threatening hypothermia, and send a signal, via link 97 to communication device 110, which, in turn, via link 120, can activate a smart phone, a wearable or other device warning the owner/veterinarian or other designate that the canine is in distress. Response from the owner/veterinarian or other designate can include the administration of medicament, e.g., adrenaline, via pharmaceutical dispenser 81 of FIG. 1D, as well as activating HHHB sourced body covering heating elements.

While these examples are provided merely to illustrate potential methods of use of the Equine Health and Safety System and Method of this disclosure, they are to be viewed as merely exemplary, and not limiting, as numerous other uses are identified herein, and other uses of the Equine Health and Safety System and Method may be readily apparent to those of ordinary skill in the art, after reading this disclosure and the appended claims.

As used herein, we have identified families of animals, e.g., equine, canine and/or feline, and specific species therein, e.g., horse, dog, and cat. However, this identification was for exemplary and non-limiting purposes. It should be expressly noted that the term "animal" with respect to the present application comprises all companion animal(s), thoroughbred horses, as well as other horses, ponies, mules, donkeys, and ungulates in general, or any other animal (excluding humans) that can benefit from the herein disclosed Equine Health and Safety System and Method.

As used herein, communications and transmissions are via all types of modes, antenna, equipment, communication(s)-device(s), analog and digital, and all transmission methods/frequencies (e.g., microwaves, optical, etc.) and modes. As noted herein, no explanation, example, embodiment or illustration shall serve to limit the invention which is defined by the appended claims.

As used herein, the singular, e.g., device and/or sensor, may also denote the plurals, e.g., devices and/or sensors, and vice-versa.

It is also within the scope of the disclosure, that two or more elements, as disclosed herein, can be combined into one element, with multiple functions. It is also to be understood, that a single element, as disclosed herein, may be divided into two or more elements without the exercise of inventive effort and therefore are within the scope of the present disclosure.

It should also be appreciated that this specification and appended claims are directed to those persons of ordinary skill in the art to which this disclosure pertains and is not limited to the exemplary or preferred embodiments disclosed herein. It will also be apparent to those same persons skilled in the art that various modifications may be made, and technologies employed, without departing from the appended claims.

I claim:

1. An equine animal health and safety system for gathering equine animal body vital life-impacting and/or life-sustaining and/or life-terminating data, measures, processes and signs and other information on the health and safety of the equine animal, the system comprising:

a tamper proof health and safety halter/hackamore/bridle for an equine animal comprising a behind-the-ears headpiece and a noseband, and at least one strap on each side of the equine animal's head connecting the headpiece and noseband, at least one of the headpiece, noseband or strap on each side of the equine animals head comprises an interior surface and an exterior surface, with a Global Positioning Sensor ("GPS"), or other location sensor, positioned internally of the interior surface and the exterior surfaces to prevent tampering therewith;

the tamper proof health and safety halter/hackamore/bridle further comprising an electronic lock to only be remotely unlockable by the use of a code to prevent unauthorized removal of the halter/hackamore/bridle from the equine animal;

the health and safety system further comprising several device/monitor/sensor/sources on the tamper proof health and safety halter/hackamore/bridle to gather the equine animal body vital life-impacting and/or life-sustaining and/or life-terminating data, measures, processes and signs and other information on the health and safety of the equine animal;

the several device/monitor/sensor/sources comprising at least one first device/monitor/sensor/source mounted on the tamper proof health and safety halter/hackamore/bridle in a position directed towards the body of the equine animal to read vital life-impacting and/or life-sustaining and/or life-threatening processes and signs directly from the animal, and at least one second device/monitor/sensor/source mounted on the tamper proof health and safety halter/hackamore/bridle directed away from the body of the equine animal to read ambient life-threatening-conditions external of the equine animal body the several device/monitor/sensor/sources further comprising at least one third device/monitor/sensor/source, the at least one third device/monitor/sensor/source being implanted painlessly-per-veterinarian-anesthesia, inserted, or ingested by the animal to provide internal information concerning the vital life data, measures, processes and signs or identity-data of the equine animal;

the health and safety system further comprising a send-receive communicating device mounted upon the tamper proof halter/hackamore/bridle, which send-receive communicating device aggregates data, measures, processes, and signs from the at least one first device/monitor/sensor/source, and the at least one second device/monitor/sensor/source and transmits the single and/or aggregated readings to a real time/archived database remote from the equine animal; the send-receive communicating device of the single and/or aggregated readings configured for transmission by at least one from the group consisting of IoT, IOTA, MIOTA and block-chain based distributable ledgers, directly to analytical/platform(s)/program(s) interfaced and/or integrated with at least one from the group consisting of a computer, the cloud, and smart communicating devices and wearables; and the health and safety halter/hackamore/bridle further comprising a first medallion, the first medallion comprising an upgradable read-write memory, the upgradable read-write memory operatively coupled to a communication link configured to be remotely upgraded by an owner of the equine animal with at least one selected from the group consisting of authorizations, information, data for a lost/missing equine animal, the medallion further comprising a button, which upon activation of the button causes the first medallion to directly act as a communication link to aid in recovery of an out-of-safe zone or disoriented equine animal, whereby the activation by pushing the button of the first medallion connects directly to the owner of the equine animal.

2. The equine animal health and safety system of claim 1, wherein the at least one first device/monitor/sensor/source comprises a plurality of flexible, small, mini-slender-finger-like-probes that comfortably protrude multi-directionally, of various constructions, angular positions, and different lengths, gently against and through the equine animal's fur/hair into multiple fur/hair penetrations and into gentle contact with the skin of the equine animal;

only some of the plurality of flexible, small, mini-slender-finger-like-probes gather the same equine animal body data, measures, processes and signs, and the data, measures, processes and signs obtained from the only some of the plurality of probes are analyzed/read/interpreted/deciphered by communicating smart devices on the equine animal and configured for transmission to a site remote from the equine animal for at least one of back-up, measurement confirmation and measurement averaging; and other of the plurality of flexible, small, mini-slender-finger-like-probes gather different equine animal body sustaining, threatening or terminating life-impacting data, measures, processes and signs.

3. The equine health and safety system of claim 2, wherein the other of the plurality of flexible, small, mini-slender-finger-like-probes gather data from at least one from the group consisting of salivary analysis and monitoring, pH detection, metabolite monitoring, virus detection, pathogen detection, surface plasmon resonance, and diagnosis of diabetic ketoacidosis.

4. The equine animal health and safety system of claim 1, further comprising at least one additional medallion mounted upon the same tamper proof health and safety halter/hackamore/bridle, wherein the at least one additional medallion is securely riveted to the tamper proof halter/hackamore/bridle and configured and enabled to send-receive communications in real time from at least one selected from the group consisting of data from stall/housing/shelter mounted or located sensors, and audio or video imaging devices positioned about the animal; wherein the at least one additional medallion is also configured for establishing at least one of data transmission(s) and data-storage and information transmission(s) to a location remote from the animal.

5. The animal health and safety system of claim 1, wherein data from the at least one third device/monitor/sensor/source is also transmitted/archived and monitored to a database remote from the animal.

6. The equine health and safety system according to claim 1, wherein the activation by pushing the button connects the first medallion directly to an owner's device selected from the group consisting of smart computer devices comprising send-receive functions; portable computer, laptop, tablet, and wearables.

7. A method for improving the health and safety of animals, the method comprising: providing an ID Bonded Registry database of registered owners and their registered animal(s);

providing at least one animal body-borne fitment from the group consisting of a harness, a halter, a hackamore, a bridle, a trapping, and a tack;

providing the at least one animal body-borne fitment with at least one device/monitor/sensor/source that reads/reports conditions external to the animal; and providing the at least one animal body-borne fitment with a device/monitor/sensor/source to read at least one condition specific to the animal's vital life processes/signs, the device/monitor/sensor/source further comprising a clock to time stamp data specific to the animal's vital life signs;

providing a tamper proof GPS or other location technology sensor secured within the animal body-borne fitment between inner and outer surfaces;

providing a nexus medallion comprising nano-electronics on the same animal body-borne fitment, the nexus medallion comprising a real-time upgradable memory component configured to time stamp and transmit data from the location of the animal in real time/archived to the ID Bonded Registry database remote from the animal and to retrieve data from the real time/archived ID Bonded Registry database;

reading/reporting from the device/monitor/sensor/source condition(s) external to the animal, from the location sensor of the animal, and from a reading specific to the animal's vital life processes/signs, to the real-time/archived ID Bonded Registry database to be archived as well as monitored in real time;

wherein the data retrieved/archived from the ID Bonded Registry database contains comprehensive registered animal vital life processes/signs, includes at least two forms of identification from the group consisting of image of the animal, video of the animal, retina scan of the animal, DNA of the animal, and genetic information of the registered animal; the data further comprises real-time communicated veterinarian health history including both text and images; and bond posted by the ownership of the ID Bonded Registry database for lost/missing registered animals in the database for at least one from the group consisting of recovery, custody, care, transport, remuneration and reunion undertakings, lifetime animal care and endowment therefor.

8. The method for improving health and safety of animals according to claim 7, wherein the vital life processes and signs in the form of data includes at least one from the group consisting of salivary analysis and monitoring, pH detection, metabolite monitoring, virus detection, pathogen detection, surface plasmon resonance, and diagnosis of diabetic ketoacidosis.

9. The method for improving the health and safety of animals according to claim 7, wherein the animal is at least one selected from equine, feline and canine.

10. The method for improving the health and safety of animals according to claim 7, further comprising archiving all data transmitted to or from the animal in the Bonded Registry database.

11. The method for improving the health and safety of animals according to claim 7, wherein the animal is one selected from the group consisting of canines and felines, wherein at least one member from the group consisting of a lead, a leash and a tether is attached to the health and safety harness; and unauthorized disconnection of the lead, leash or tether from the harness generates and transmits an alarm, and also to a loudspeaker attached to the health and safety harness.

12. The method for improving the health and safety of animals according to claim 7, wherein the animal is one selected from the group of canines and felines, and wherein the least one animal body-borne fitment is a harness, the harness further comprising a medallion, the medallion comprising an upgradable read-write memory comprising nano-electronics, the upgradable read-write memory operatively coupled to a communication link configured to be remotely upgraded with at least one selected from the group consisting of authorizations, information, data for a lost/missing animal.

13. The method for improving the health and safety of animals according to claim 7, wherein the registered animal is a canine trained as at least one from the group consisting of guard dogs, war/military dogs, police dogs, service dogs, sled-dogs and rescue dogs.

14. The method for improving the health and safety of animals according to claim 7, the method further comprising combining the sensing/monitoring of the registered animal's vital life processes/signs, and external conditions vitally impacting animal processes, as well as the monitoring, analyzing and real time communicating vital aspects of the animal sourced from the health and safety ID database, to determine whether the present location of the animal, as determined from the GPS or other location technology sensor, is monitored/analyzed as safe/unsafe for the animal.

15. The method for improving the health and safety of animals according to claim 7, further comprising analyzing the registered animal's vital processes/signs archived in the health and safety ID database to assess/diagnose urgent and emergency noticing in real time to the registered owner of the registered animal.

16. The method for improving the health and safety of animals according to claim 7, further providing for Public Health benefits, wherein the data received in the health and safety ID database, including the monitoring, analyzing and communicating the registered animal's vital life signs to the database, provides early potential professional awareness of animal-to-human zoonotic disease transmissions.

17. The method for improving the health and safety of animals according to claim 7, the animal health and safety ID database further comprising registered animal ownership-sourced pooled-dollar-resources for at least one from the group consisting of veterinary care cost-sharing and pre-authorized professional animal ownership care-custody-identification-location-transport-recovery-remuneration-reunion.

18. A Pet-Parents reciprocal health and safety database identification (ID) support and reciprocity method including sourced pet care capabilities and pet support services, the method comprising:

providing a health and safety ID database of all registered pet owners and their companion animal(s);

creating archived information of some of the registered pet owners in the health and safety ID database who express/offer volunteer interest in pet care assisting-sharing-supporting or reciprocity with other companion animal owners among the other registered pet owners in the health and safety ID database;

permitting to those who expressed/offered volunteer interest in pet care assisting-sharing-supporting or reciprocity to access the archived information, for a fee or no fee, and per privacy protocols and screenings, confidential controlled access to the other registered pet owners' archived information recorded in the health and safety ID database who seek shared assistance and support or reciprocity for their companion animals' care, tasks and enjoyments including identification to those who expressed/offered volunteer interest in pet care to all archived information in the health and safety ID database from the group consisting of the species/ breed/size/behavior/health of the companion animal(s), the other registered owners' contact information, location of the other registered owners and their companion animal(s), and assistance-sharing and support desired for the companion animal(s), for the purpose of assistance, support or reciprocal care sharing of the companion animal's other registered owners' pet care duties, tasks and enjoyments, wellness/recreational activities and support sharing among those who expressed/offered volunteer interest in pet care and the companion animal(s) of other registered owners in the health and safety ID database; and permitting at least one from the group consisting of pet care assistance, pet care support, pet care sharing and pet care reciprocity from those who expressed/offered volunteer interest in pet care relative to other registered pet owners in the health and safety ID database.

19. The Pet-Parents reciprocal health and safety database identification (ID) support and reciprocity method of claim 18, further comprising providing to those who expressed/offered volunteer interest in pet care assisting-sharing-supporting or reciprocity with other companion animal owners among the other registered owners in the health and safety ID database, the zip code location of the registered animal.

* * * * *